US009449041B2

(12) United States Patent
Nie et al.

(10) Patent No.: US 9,449,041 B2
(45) Date of Patent: Sep. 20, 2016

(54) DATABASE SYSTEM LOCK OPERATION METHOD AND DEVICE

(71) Applicant: Huawei Technologies Co., Ltd., Shenzhen (CN)

(72) Inventors: Yuanyuan Nie, Beijing (CN); Huijun Liu, Beijing (CN); Chuanting Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 14/323,546

(22) Filed: Jul. 3, 2014

(65) Prior Publication Data

US 2014/0372396 A1 Dec. 18, 2014

Related U.S. Application Data

(63) Continuation of application No. PCT/CN2014/071030, filed on Jan. 21, 2014.

(30) Foreign Application Priority Data

Jun. 6, 2013 (CN) .......................... 2013 1 0222370

(51) Int. Cl.
*G06F 17/30* (2006.01)

(52) U.S. Cl.
CPC ... *G06F 17/30371* (2013.01); *G06F 17/30362* (2013.01)

(58) Field of Classification Search
CPC .................. G06F 17/30362; G06F 17/30371; G06F 12/00; G06F 12/1466; G06F 12/1491
See application file for complete search history.

(56) References Cited

U.S. PATENT DOCUMENTS

| 5,596,754 A | 1/1997 | Lomet |
| 6,343,339 B1 | 1/2002 | Daynes |

(Continued)

FOREIGN PATENT DOCUMENTS

| CN | 101364230 A | 2/2009 |
| CN | 102129391 A | 7/2011 |

(Continued)

OTHER PUBLICATIONS

Devulapalli, A., et al., "Distributed Queue-based Locking using Advanced Network Features," Proceedings of the 2005 International Conference on Parallel Processing, Jun. 14-17, 2005, 8 pages.

(Continued)

*Primary Examiner* — Truong Vo
(74) *Attorney, Agent, or Firm* — Conley Rose, P.C.; Grant Rodolph; Adam J. Stegge

(57) ABSTRACT

A database system lock operation method is provided that includes: acquiring, by a first processing node, a lock operand of a target lock; using, by the first processing node, the target lock to perform a lock acquiring operation on a target data object; when the lock operand meets a condition for a successful lock acquiring operation, determining, by the first processing node, that the lock acquiring operation is successful, and updating a value of a data bit that is in the lock operand and used to indicate a state of the target lock on the first processing node to a value that is used to indicate that the state of the target lock on the first processing node is lock held. Accordingly, the embodiments of the present invention further disclose a node device. The embodiments of the present invention can improve performance of a database system.

14 Claims, 12 Drawing Sheets

(56) References Cited

U.S. PATENT DOCUMENTS

| | | |
|---|---|---|
| 6,658,513 B1 | 12/2003 | Boonie et al. |
| 6,850,938 B1 | 2/2005 | Sadjadi |
| 8,271,437 B2 | 9/2012 | Arcese et al. |
| 2004/0267824 A1 | 12/2004 | Pizzo et al. |
| 2005/0234989 A1* | 10/2005 | Bailey ............... G06F 17/30362 |
| 2005/0289143 A1 | 12/2005 | Oshri et al. |
| 2006/0242104 A1 | 10/2006 | Ellis et al. |
| 2010/0023521 A1 | 1/2010 | Arcese et al. |

FOREIGN PATENT DOCUMENTS

| | | |
|---|---|---|
| CN | 102355473 A | 2/2012 |
| CN | 103336789 A | 10/2013 |
| KR | 19990085299 A | 12/1999 |
| RU | 2380748 C2 | 1/2010 |
| RU | 2413984 C2 | 3/2011 |

OTHER PUBLICATIONS

Foreign Communication From a Counterpart Application, European Application No. 14730727.6, Extended European Search Report dated Jul. 29, 2015, 10 pages.

Foreign Communication From a Counterpart Application, Chinese Application No. 2013102223705, Chinese Search Report dated Dec. 27, 2015, 2 pages.

Foreign Communication From a Counterpart Application, Chinese Application No. 201310222370.5, Chinese Office Action dated Jan. 5, 2016, 3 pages.

Partial English Translation and Abstract of Chinese Patent Application No. CN103336789, Aug. 22, 2014, 11 pages.

Foreign Communication From a Counterpart Application, PCT Application No. PCT/CN2014/071030, International Search Report dated May 12, 2014, 7 pages.

Foreign Communication From a Counterpart Application, PCT Application No. PCT/CN2014/071030, Written Opinion dated May 12, 2014, 5 pages.

Foreign Communication From a Counterpart Application, Russian Application No. 2014133161, Russian Letter dated Dec. 7, 2015, 1 page.

Foreign Communication From a Counterpart Application, Russian Application No. 2014133161, Russian Office Action dated Nov. 9, 2015, 5 pages.

Foreign Communication From a Counterpart Application, Russian Application No. 2014133161, English Translation of Russian Office Action dated Nov. 9, 2015, 5 pages.

Foreign Communication From a Counterpart Application, Russian Application No. 2014133161, Russian Notice of Allowance dated Jan. 11, 2016, 18 pages.

Foreign Communication From a Counterpart Application, Russian Application No. 2014133161, English Translation of Russian Notice of Allowance dated Jan. 11, 2016, 18 pages.

* cited by examiner

DATABASE SYSTEM LOCK OPERATION METHOD AND DEVICE

CROSS-REFERENCE TO RELATED APPLICATIONS

This application is a continuation of International Application No. PCT/CN2014/071030, filed on Jan. 21, 2014, which claims priority to Chinese Patent Application No. 201310222370.5, filed on Jun. 6, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the database field, and in particular, to a database system lock operation method and a device.

BACKGROUND

A shared cluster database system is mainly used for an on-line transaction processing (OLTP) application. The application needs to support a large number of concurrent users to periodically add and modify data. Therefore, the entire database system needs to manage a large number of locks of all types. Common locks include a page lock, a routine lock, a tuple lock, and the like. Because the database system needs to use the locks to ensure consistency of various states of a database, lock acquiring and lock releasing, like an input/output (I/O) operation, is generally one of most time-consuming operations in the database system. Therefore, a design of a lock subsystem in the database affects performance of the entire database system to a great extent.

In addition to managing all types of locks, the lock subsystem further needs to implement a lock acquiring or lock releasing operation for these locks. A locking state of each lock includes two locking states: Shared lock held and Exclusive lock held. Therefore, the lock acquiring or lock releasing operation may include an operation of acquiring a shared lock or an operation of releasing a shared lock and an operation of acquiring an exclusive lock or an operation of releasing an exclusive lock.

At present, a lock acquiring or lock releasing operation of a lock is mainly implemented in the following manner:

A processing node (PN) sends a request message to a central coordinator node (CN). The request message includes information about a target lock. The request message may be a lock acquiring request message or a lock releasing request message. If the request message is the lock acquiring request message, the request message includes a request message for requesting to acquire a shared lock or a request message for requesting to acquire an exclusive lock.

After receiving the request message, the CN searches for the target lock according to the information about the target lock. If the request message is the lock acquiring request message, and a lock can be acquired for the target lock, lock acquiring is performed on the target lock, and a message indicating that lock acquiring is successful is returned to the PN. If the request message is the lock acquiring request message, and no lock can be acquired for the target lock at present, a request message for requesting the PN to join a waiting queue of the target lock is sent to the PN. If the request message is the lock releasing request message, lock releasing is performed on the target lock. If the waiting queue of the target lock includes other PNs, one PN is selected from the other PNs, and a notification message is sent to the PN to implement transfer of the target lock.

In the foregoing technology, a PN must perform message exchange with a CN to complete a lock acquiring or lock releasing operation of any lock. However, in an actual application, the number of lock acquiring or lock releasing operations that a PN performs on a lock is huge. In this way, a CN needs to process a great number of lock messages, which causes the CN to easily reach a performance bottleneck, thereby causing low performance of a database system.

SUMMARY

Embodiments of the present invention provide a database system lock operation method and a device to improve performance of a database system.

According to a first aspect, the present invention provides a database system lock operation method. The method includes: acquiring, by a first processing node, a lock operand of a target lock, where the lock operand is used to record a current state of the target lock on each processing node in the database system, and the current state of the target lock on each processing node in the database system is represented by one or more data bits in the lock operand; using, by the first processing node, the target lock to perform a lock acquiring operation on a target data object, and updating a value of a data bit that is in the lock operand and used to indicate a state of the target lock on the first processing node to a value that is used to indicate that the state of the target lock on the first processing node is lock held; and determining, by the first processing node according to the lock operand, whether the lock acquiring operation is successful.

In a first possible implementation manner, the updating a value of a data bit that is in the lock operand and used to indicate a state of the target lock on the first processing node to a value that is used to indicate that the state of the target lock on the first processing node is lock held includes: acquiring an original value of the lock operand at a moment when the target lock is used to perform the lock acquiring operation on the target data object; and updating the value of the data bit that is in the original value and used to indicate the state of the target lock on the first processing node to the value that is used to indicate that the state of the target lock on the first processing node is lock held; and the determining, by the first processing node according to the lock operand, whether the lock acquiring operation is successful includes: determining, by the first processing node when the original value meets a condition for a successful lock acquiring operation, that the lock acquiring operation is successful; when the original value does not meet a condition for a successful lock acquiring operation, determining that the lock acquiring operation fails.

With reference to the first possible implementation manner of the first aspect, in a second possible implementation manner, the using, by the first processing node, the target lock to perform a lock acquiring operation on the target data object includes: using, by the first processing node, the target lock to perform an operation of acquiring a shared lock on the target data object; the updating the value of the data bit that is in the original value and used to indicate the state of the target lock on the first processing node to the value that is used to indicate that the state of the target lock on the first processing node is lock held includes: adding the value of the data bit that is in the original value and used to indicate the state of the target lock on the first processing node and a preset first value to obtain an updated value of the lock operand, where the value of the data bit that is in the updated value and used to indicate the state of the target lock on the first processing node is a value indicating that the state of the target lock on the first processing node is Shared lock held; and the determining, by the first processing node when the original value meets a condition for a successful lock acquiring operation, that the lock acquiring operation is successful; when the original value does not meet a condition for a successful lock acquiring operation, determining that the lock acquiring operation fails includes: determining, by the first processing node, whether a state, which is recorded in the original value, of the target lock on each processing node in the database system is a state of allowing acquiring a shared lock; and determining, if the state, which is recorded in the original value, of the target lock on each processing node in the database system is the state of allowing acquiring a shared lock, that the operation of acquiring a shared lock is successful, or determining, if the state, which is recorded in the original value, of the target lock on each processing node in the database system is not the state of allowing acquiring a shared lock, that the operation of acquiring a shared lock fails, where the state of allowing acquiring a shared lock is any one state of a No lock held state and a Shared lock held state.

With reference to the first possible implementation manner of the first aspect, in a third possible implementation manner, the using, by the first processing node, the target lock to perform a lock acquiring operation on the target data object includes: using, by the first processing node, the target lock to perform an operation of acquiring an exclusive lock on the target data object; the updating the value of the data bit that is in the original value and used to indicate the state of the target lock on the first processing node to the value that is used to indicate that the state of the target lock on the first processing node is lock held includes: adding the value of the data bit that is in the original value and used to indicate the state of the target lock on the first processing node and a preset second value to obtain an updated value of the lock operand, where the value of the data bit that is in the updated value and used to indicate the state of the target lock on the first processing node is a value indicating that the state of the target lock on the first processing node is Exclusive lock held; and the determining, by the first processing node when the original value meets a condition for a successful lock acquiring operation, that the lock acquiring operation is successful; when the original value does not meet a condition for a successful lock acquiring operation, determining that the lock acquiring operation fails includes: determining, by the first processing node, whether a state, which is recorded in the original value, of the target lock on each processing node in the database system is a state of allowing acquiring a shared lock; and determining, if the state, which is recorded in the original value, of the target lock on each processing node in the database system is the state of allowing acquiring a shared lock, that the operation of acquiring an exclusive lock is successful, or determining, if the state, which is recorded in the original value, of the target lock on each processing node in the database system is not the state of allowing acquiring a shared lock, that the operation of acquiring an exclusive lock fails; or determining, by the first processing node, whether a state, which is recorded in the original value, of the target lock is Shared lock held on the first processing node and No lock held on another processing node; and determining, if the state, which is recorded in the original value, of the target lock is Shared lock held on the first processing node and No lock held on the another processing node, that the operation of acquiring an exclusive lock is successful, or determining, if the state, which is recorded in the original value, of the target lock is not Shared lock held on the first processing node or No lock held on the another processing node, that the operation of acquiring an exclusive lock fails, where the another processing node is all processing nodes other than the first processing node in the database system, and the state of allowing acquiring a shared lock is any one state of a No lock held state and a Shared lock held state.

With reference to the first possible implementation manner of the first aspect or the second possible implementation manner of the first aspect, in a fourth possible implementation manner, the method further includes: updating, when the first processing node determines that the lock acquiring operation fails, the value of the data bit that is in the updated value and used to indicate the state of the target lock on the first processing node to a value that is used to indicate that the state of the target lock on the first processing node is Lock pending.

According to a second aspect, the present invention provides a database system lock operation method. The method includes: acquiring, by a first processing node, a lock operand of a target lock, where the lock operand is used to record a current state of the target lock on each processing node in the database system, and the current state of the target lock on each processing node in the database system is represented by one or more data bits in the lock operand; using, by the first processing node, the target lock to perform a lock releasing operation on a target data object; and updating, by the first processing node, a value of a data bit that is in the lock operand and used to indicate a state of the target lock on the first processing node to a value that is used to indicate that the state of the target lock on the first processing node is No lock held, so that a processing node in the database system knows, according to the lock operand, that the state of the target lock on the first processing node is No lock held.

In a first possible implementation manner, the updating, by the first processing node, a value of a data bit that is in the lock operand and used to indicate a state of the target lock on the first processing node to a value that is used to indicate that the state of the target lock on the first processing node is No lock held includes: acquiring, by the first processing node, an original value of the lock operand at a moment when the target lock is used to perform the lock releasing operation on the target data object, and adding the value of the data bit that is in the original value and used to indicate the state of the target lock on the first processing node and a preset third value to obtain an updated value of the lock operand, where the value of the data bit that is in the updated value and indicates the state of the target lock on the first processing node is the value indicating that the state of the target lock on the first processing node is No lock held.

With reference to the first possible implementation manner of the second aspect, in a second possible implementation manner, after the using, by the first processing node, the value of the data bit that is in the updated value and used to indicate the state of the target lock on the first processing node as the value that is used to indicate that the state of the target lock on the first processing node is No lock held, the method further includes: determining, by the first processing node, whether a Lock pending state exists in states, which are indicated by the original value, of the target lock on various processing nodes in the database system, and, if the Lock pending state exists in the states, which are indicated by the original value, of the target lock on the processing nodes in the database system, sending the updated value to a processing node on which the state of the target lock is Lock pending, so that the processing node on which the state of the target lock is the Lock pending state performs a lock operation on the target lock.

According to a third aspect, the present invention provides a node device. The node device includes an acquiring unit, an operating unit, and a determining unit, where: the acquiring unit is configured to acquire a lock operand of a target lock, where the lock operand is used to record a current state of the target lock on each processing node in a database system, the database system is a database system in which the node device locates, and the current state of the target lock on each processing node in the database system is represented by one or more data bits in the lock operand; the operating unit is configured to use the target lock to perform a lock acquiring operation on a target data object on the node device, and update a value of a data bit that is in the lock operand and used to indicate a state of the target lock on a first processing node to a value that is used to indicate that the state of the target lock on the first processing node is lock held; and the determining unit is configured to determine, according to the lock operand, whether the lock acquiring operation is successful.

In a first possible implementation manner, the operating unit specifically includes: a lock acquiring unit configured to use the target lock to perform the lock acquiring operation on the target data object on the node device; the acquiring unit configured to acquire an original value of the lock operand at a moment when the lock acquiring unit uses the target lock to perform the lock acquiring operation on the target data object on the node device; a first updating unit configured to update a value of a data bit that is in the original value and used to indicate a state of the target lock on the node device to the value that is used to indicate that the state of the target lock on the first processing node is lock held; and the determining unit, specifically configured to determine, when the original value meets a condition for a successful lock acquiring operation, that the lock acquiring operation is successful, or determine, when the original value does not meet a condition for a successful lock acquiring operation, that the lock acquiring operation fails.

With reference to the first possible implementation manner of the third aspect, in a second possible implementation manner, the lock acquiring unit is specifically configured to use the target lock to perform an operation of acquiring a shared lock on the target data object; the first updating unit is specifically configured to add the value of the data bit that is in the original value and used to indicate the state of the target lock on the first processing node and a preset first value to obtain an updated value of the lock operand, where the value of the data bit that is in the updated value and used to indicate the state of the target lock on the first processing node is a value indicating that the state of the target lock on the first processing node is Shared lock held; and the determining unit is specifically configured to determine whether a state, which is recorded in the original value, of the target lock on each processing node in the database system is a state of allowing acquiring a shared lock; and, if the state, which is recorded in the original value, of the target lock on each processing node in the database system is the state of allowing acquiring a shared lock, determine that the operation of acquiring a shared lock is successful, or, if the state, which is recorded in the original value, of the target lock on each processing node in the database system is not the state of allowing acquiring a shared lock, determine that the operation of acquiring a shared lock fails, where the state of allowing acquiring a shared lock is any one state of a No lock held state and a Shared lock held state.

With reference to the first possible implementation manner of the third aspect, in a third possible implementation manner, the lock acquiring unit is specifically configured to use the target lock to perform an operation of acquiring an exclusive lock on the target data object; the first updating unit is specifically configured to add the value of the data bit that is in the original value and used to indicate the state of the target lock on the first processing node and a preset second value to obtain an updated value of the lock operand, where the value of the data bit that is in the updated value and used to indicate the state of the target lock on the first processing node is a value indicating that the state of the target lock on the first processing node is Exclusive lock held; and the determining unit is specifically configured to determine whether a state, which is recorded in the original value, of the target lock on each processing node in the database system is a state of allowing acquiring a shared lock; and, if the state, which is recorded in the original value, of the target lock on each processing node in the database system is the state of allowing acquiring a shared lock, determine that the operation of acquiring an exclusive lock is successful, or, if the state, which is recorded in the original value, of the target lock on each processing node in the database system is not the state of allowing acquiring a shared lock, determine that the operation of acquiring an exclusive lock fails; or the determining unit is specifically configured to determine whether the state, which is recorded in the original value, of the target lock is Shared lock held on the node device and No lock held on another processing node; and, if the state, which is recorded in the original value, of the target lock is Shared lock held on the node device and No lock held on the another processing node, determine that the operation of acquiring an exclusive lock is successful, or, if the state, which is recorded in the original value, of the target lock is not Shared lock held on the node device or No lock held on the another processing node, determine that the operation of acquiring an exclusive lock fails, where the another processing node is all processing nodes other than the node device in the database system, and the state of allowing acquiring a shared lock is any one state of a No lock held state and a Shared lock held state.

With reference to the second possible implementation manner of the third aspect or the third possible implementation manner of the third aspect, in a fourth possible implementation manner, the node device further includes: a second updating unit configured to update, when the determining unit determines that the lock acquiring operation fails, the value of the data bit that is in the updated value and used to indicate the state of the target lock on the first processing node to a value that is used to indicate that the state of the target lock on the first processing node is Lock pending.

According to a fourth aspect, the present invention provides a node device. The node device includes an acquiring unit, an operating unit, and an updating unit, where: the acquiring unit is configured to acquire a lock operand of a target lock, where the lock operand is used to record a current state of the target lock on each processing node in a database system, where the database system is a database system in which the node device locates; and the current state of the target lock on each processing node in the database system is represented by one or more data bits in the lock operand; the operating unit is configured to use the target lock to perform a lock releasing operation on a target data object; and the updating unit is configured to update a value of a data bit that is in the lock operand and used to indicate a state of the target lock on the node device to a value that is used to indicate that the state of the target lock on the node device is No lock held, so that a processing node in the database system knows, according to the lock operand, that the state of the target lock on the node device is No lock held.

In a first possible implementation manner, the updating unit is specifically configured to acquire an original value of the lock operand at a moment when the target lock is used to perform the lock releasing operation on the target data object, and add the value of the data bit that is in the original value and used to indicate the state of the target lock on the node device and a preset third value to obtain an updated value of the lock operand, where the value of the data bit that is in the updated value and indicates the state of the target lock on the node device is the value indicating that the state of the target lock on the node device is No lock held.

With reference to the first possible implementation manner of the fourth aspect, in a second possible implementation manner, the node device further includes: a judging unit configured to determine, after the updating unit updates the value of the data bit that is in the lock operand and used to indicate the state of the target lock on the node device to the value that is used to indicate that the state of the target lock on the node device is No lock held, whether a Lock pending state exists in states, which are indicated by the original value, of the target lock on various processing nodes in the database system, and, if the Lock pending state exists in the states, which are indicated by the original value, of the target lock on the processing nodes in the database system, send the updated value to a processing node on which the state of the target lock is Lock pending, so that the processing node on which the state of the target lock is the Lock pending state performs a lock operation on the target lock.

In the foregoing technical solution, a first processing node acquires a lock operand of a target lock, where the lock operand is used to record a current state of the target lock on each processing node in a database system, and the current state of the target lock on each processing node in the database system is represented by one or more data bits in the lock operand; uses the target lock to perform a lock acquiring operation on a target data object; and, when the lock operand meets a condition for a successful lock acquiring operation, determines that the lock acquiring operation is successful and updates a value of a data bit that is in the lock operand and used to indicate a state of the target lock on the first processing node to a value that is used to indicate that the state of the target lock on the first processing node is lock held. In this way, a processing node implements a lock operation by using the lock operand and an entire lock operation process is independently completed by the processing node, which makes a central coordinator node free from processing a lock message, thereby improving performance of the database system.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
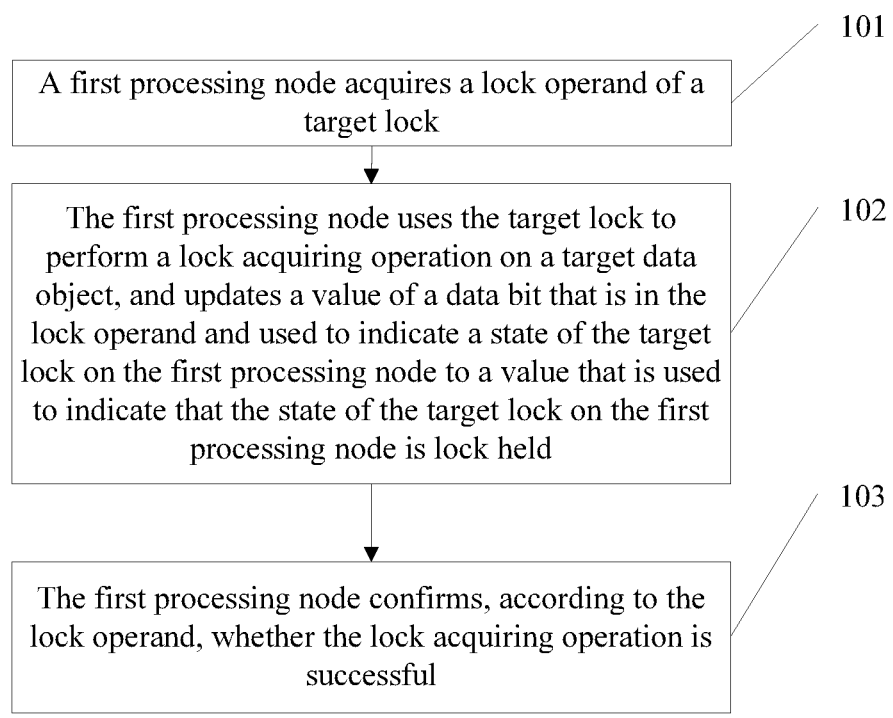
FIG. 1 is a schematic flowchart of a database system lock operation method according to an embodiment of the present invention.

FIG. 1 is a schematic flowchart of a database system lock operation method according to an embodiment of the present invention. The database system in which a lock resides includes N PNs, where N is an integer larger than 0. As shown in FIG. 1, the method includes:

101: A first PN acquires a lock operand of a target lock, where the lock operand is used to record a current state of the target lock on each PN in the database system, and the current state of the target lock on each PN in the database system is represented by one or more data bits in the lock operand.

Optionally, the foregoing first PN may be any PN in the database system, and the foregoing target lock is any lock in the foregoing system, such as a group lock and a page lock. Lock operands of all locks in the database system may be stored in a central coordinator node (CN) in the database system. Therefore, the first PN may obtain the lock operand of the target lock by querying in the CN, thereby obtaining current state information about the target lock on each processing node in the database system.

Optionally, in the embodiment of the present invention, a state of the target lock on a PN may include at least one of the following: No lock held, Shared lock held, Exclusive lock held, and Lock pending. A state value in the foregoing lock operand indicates a state of using the target lock on a PN.

102: The first PN uses the target lock to perform a lock acquiring operation on a target data object.

103: When the lock operand meets a condition for a successful lock acquiring operation, the first PN determines that the lock acquiring operation is successful and updates a value of a data bit that is in the lock operand and used to indicate a state of the target lock on the first PN to a value that is used to indicate that the state of the target lock on the first PN is lock held.

As an optional implementation manner, a device of implementing the present invention, that is, the PN, may be any node device in the database system, such as a computer and a node device in a network, for example, a base station and a controller device.

In the foregoing technical solution, a first PN acquires a lock operand of a target lock, where the lock operand is used to record a current state of the target lock on each PN in the database system, and the current state of the target lock on each PN in the database system is represented by one or more data bits in the lock operand; the first PN uses the target lock to perform a lock acquiring operation on a target data object; and, when the lock operand meets a condition for a successful lock acquiring operation, the first PN determines that the lock acquiring operation is successful and updates a value of a data bit that is in the lock operand and used to indicate a state of the target lock on the first PN to a value that is used to indicate that the state of the target lock on the first PN is lock held. In this way, an entire lock operation process is independently completed by the first PN, which makes a CN free from processing a lock message, thereby improving performance of the database system.

Figure 2:
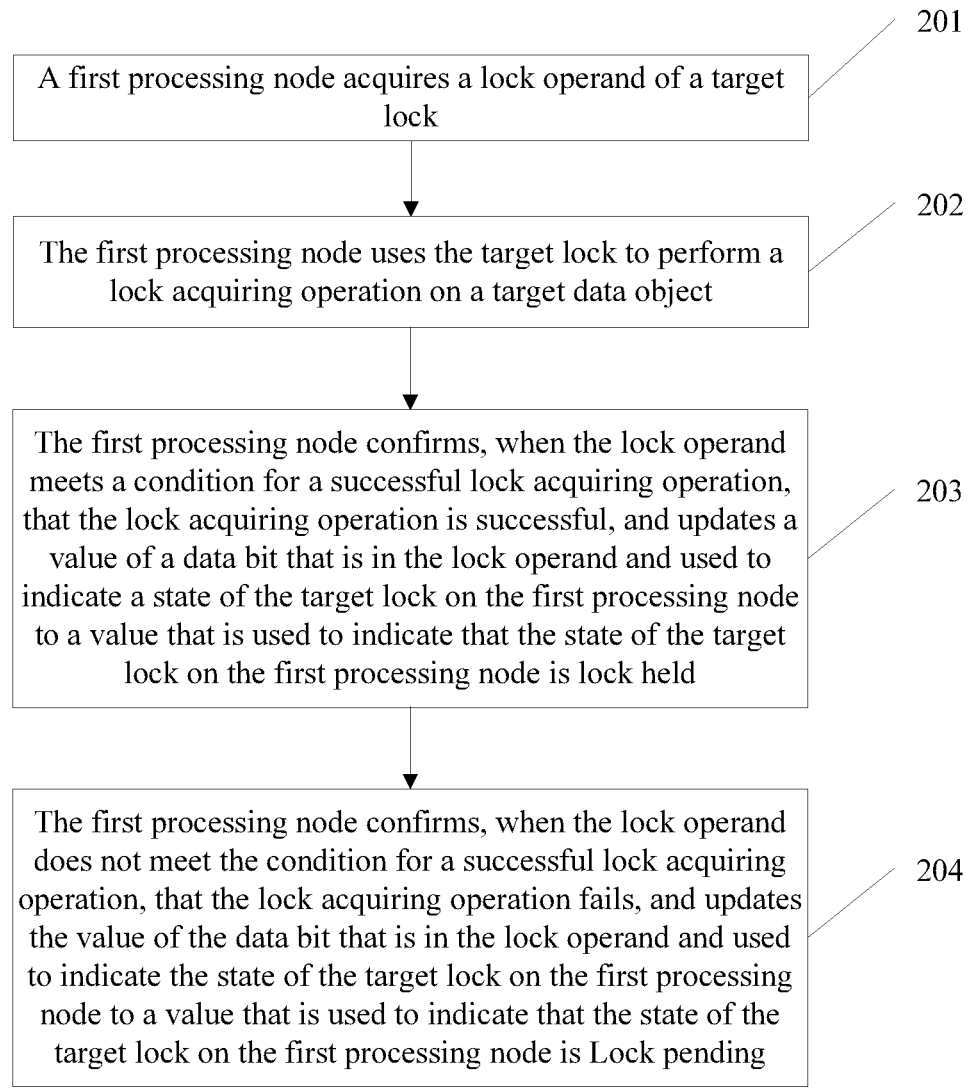
FIG. 2 is a schematic flowchart of another database system lock operation method according to an embodiment of the present invention.

FIG. 2 is a schematic flowchart of another database system lock operation method according to an embodiment of the present invention. As shown in FIG. 2, the method includes:

201: A first PN acquires a lock operand of a target lock, where the lock operand is used to record a current state of the target lock on each PN in the database system, and the current state of the target lock on each PN in the database system is represented by one or more data bits in the lock operand.

As an optional implementation manner, the foregoing lock operand may be a group of M-bit binary numerals, where M is the number of bits of an operating system of a PN. For example, M is 32 for a 32-bit operating system. For example, if an operating system is 128, M is 128.

Optionally, in this implementation manner, if the number of PNs in the foregoing database system is N, and N and M meet N=M/2, the foregoing lock operand may include data of N 2-bit binary numerals. Data of one 2-bit binary numeral indicates a state of the target lock on one PN, that is, the current state of the target lock on each PN in the database system is represented by data of one 2-bit binary numeral in the lock operand.

Optionally, a node identifier may be set for each PN in the foregoing system. Therefore, a mapping relationship between a position of a binary numeral in the lock operand and a node identifier may be established in the embodiment of the present invention. For example, if node identifiers of the foregoing N PNs are 0123 . . . N, the foregoing mapping relationship may be that data of bits 0 and 1 in the lock operand may indicate a state of the target lock on a PN whose node identifier is 0, data of bits 2 and 3 in the lock operand may indicate a state of the target lock on a PN whose node identifier is 1, data of bits 3 and 4 in the lock operand may indicate a state of the target lock on a PN whose node identifier is 2, data of bits 5 and 6 in the lock operand may indicate a state of the target lock on a PN whose node identifier is 3, . . . , and data of bits N−1 and N in the lock operand may indicate a state of the target lock on a PN whose node identifier is N. For example, if a node identifier of the first PN is 0, a binary numeral in bits 0 and 1 in the lock operand indicates a state of the target lock on the first PN. Certainly, the foregoing node identifiers and the foregoing mapping relationship are only used as one example in the embodiment of the present invention. The embodiment of the present invention includes, but is not limited to, the foregoing listed node identifiers and mapping relationship.

Optionally, a state of the target lock on a PN may include at least one of the following: No lock held, Shared lock held, Exclusive lock held, and Lock pending. In the embodiment of the present invention, a mapping relationship between a value of a binary numeral and a lock state may also be established. The mapping relationship may be shown as follows:

| Lock Operand (2 Bits) | Lock State |
|---|---|
| 00 | No lock held |
| 01 | Shared lock held |
| 10 | Exclusive lock held |
| 11 | Lock pending |

The foregoing table only shows a 2-bit binary numeral, indicating a state of the target lock on one PN. For example, the 2-bit binary numeral in the table is bits 0 and 1, that is, the 2-bit binary numeral in the table indicates the state of the target lock on the PN whose node identifier is 0. When the 2-bit binary numeral in the table is 01, the state of the target lock on the PN whose node identifier is 0 is Shared lock held. When the 2-bit binary numeral in the table is 10, the state of the target lock on the PN whose node identifier is 0 is Exclusive lock held. Certainly, the embodiment of the present invention includes, but is not limited to, the foregoing listed mapping relationship between a value of a binary numeral and a lock state.

202: The first PN uses the target lock to perform a lock acquiring operation on a target data object.

As an optional implementation manner, the foregoing lock acquiring operation may include: an operation of acquiring a shared lock or an operation of acquiring an exclusive lock.

203: When the lock operand meets a condition for a successful lock acquiring operation, the first PN determines that the lock acquiring operation is successful and updates a value of a data bit that is in the lock operand and used to indicate the state of the target lock on the first PN to a value that is used to indicate that the state of the target lock on the first PN is lock held.

For example, as shown in the foregoing mapping relationship, a value indicating a lock held state is 01 or 10. In this way, when the shared lock is acquired in step 202, the value of the data bit that is in the lock operand and used to indicate the state of the target lock on the first PN may be updated to 01 in step 203. When the exclusive lock is acquired in step 202, the value of the data bit that is in the lock operand and used to indicate the state of the target lock on the first PN may be updated to 10 in step 203.

As an optional implementation manner, after step 203, the method may further include:

204: When the lock operand does not meet the condition for a successful lock acquiring operation, the first PN determines that the lock acquiring operation fails and updates the value of the data bit that is in the lock operand and used to indicate the state of the target lock on the first PN to a value that is used to indicate that the state of the target lock on the first PN is Lock pending.

In this way, it can be implemented that when the lock acquiring operation fails, the state of the target lock on the first PN can be updated to Lock pending.

As an optional implementation manner, step 203 may include:

The first PN acquires an original value of the lock operand at a moment when the target lock is used to perform the lock acquiring operation on the target data object, and adds the value of the data bit that is in the original value and used to indicate the state of the target lock on the first PN and a preset first value to obtain an updated value of the lock operand; and when the original value meets the condition for a successful lock acquiring operation, the first PN determines that the lock acquiring operation is successful and uses the value of the data bit that is in the updated value and used to indicate the state of the target lock on the first PN as the value that is used to indicate that the state of the target lock on the first PN is lock held.

Optionally, when the mapping relationship between a position of a binary numeral in the lock operand and a node identifier meets the foregoing listed mapping relationship, and the mapping relationship between a value of a binary numeral and a lock state meets the mapping relationship shown in the foregoing table, the foregoing first value may be 01 or 10.

Optionally, if the operation of acquiring a shared lock is performed in step 202, the foregoing updated value may be obtained by adding the original value of the foregoing lock operand and $4^i$, that is, only by executing one $W+4^i$ in step 203, where $4^i$ is a binary numeral (for example, $4^0=0001$, $4^1=0100$, $4^2=010000$), i is the node identifier of the first PN, and W is the original value of the foregoing lock operand. For example, when the node identifier of the first PN is 0, 0001 is added to W. When the node identifier of the first PN is 1, 0100 is added to W. It should be noted that, in this implementation manner, calculation is performed only according to the foregoing listed mapping relationship, and an algorithm in step 203 may change accordingly when the foregoing mapping relationship changes.

Optionally, the foregoing original value refers to the value of the foregoing lock operand at the moment when the first PN performs the lock acquiring operation on the target lock in step 202. In an actual application, a plurality of PNs in the database system may perform a lock operation on the foregoing target lock. In addition, time for these PNs to perform the lock operation on the target lock may be close. That is, another PN performs the lock operation on the target lock between execution of step 201 and 202 in the embodiment of the present invention. In this way, a data bit that is in the lock operand and used to indicate a state of the target lock on the another PN is changed, that is, the value of the foregoing lock operand is updated, that is, the value, which is acquired in step 201, of the lock operand may not be a latest value when the lock acquiring operation is performed on the target lock. Therefore, to ensure that whether the lock acquiring operation in step 202 is successful can be known, the foregoing original value, that is, the value of the foregoing lock operand at the moment when the lock acquiring operation is executed in step 202, can be acquired in step 203.

Optionally, a Fetch and Add (FAA) operation (content of the operation is an atomic operation that adds a value to an original value of an operand and returns the original value) includes atomic operations. An atomic operation is an operation that is always executed in a database system or a PN, that is, the operation is always executed from startup to shutdown. In this way, the original value of the foregoing lock operand may be acquired by using the foregoing FAA operation. Because the content of the FAA operation is the atomic operation that adds the original value of the lock operand and a value and returns the original value, the original value of the foregoing lock operand can be acquired in step 203 by using the operation. In addition, the foregoing first value, for example, the foregoing $4^i$, is added in the FAA operation. That is, the foregoing updated value can be obtained only by executing one $W+4^i$ in step 203, where i is a node identifier of a current PN and W is the original value of the foregoing lock operand.

Optionally, step 202 may include:

The first PN uses the target lock to perform the operation of acquiring a shared lock on the target data object.

That the first PN determines, when the original value meets the condition for a successful lock acquiring operation, that the lock acquiring operation is successful in step 203 may include:

The first PN determines whether a state, which is recorded in the original value, of the target lock on each PN in the database system is a state of allowing shared lock acquiring, and, if the state, which is recorded in the original value, of the target lock on each PN in the database system is the state of allowing acquiring a shared lock, determines that the operation of acquiring a shared lock is successful, where the state of allowing acquiring a shared lock is any one state of a No lock held state and a Shared lock held state.

That is, the foregoing condition for a successful lock acquiring operation may include:

The state, which is indicated by the original value, of the target lock on each PN in the database system is the foregoing state of allowing acquiring a shared lock, that is, No lock held or Shared lock held. That is, the state, which is indicated by the foregoing original value, of the target lock on each PN in the database system is either No lock held or Shared lock held. The state, which is indicated by the foregoing original value, of the target lock on each PN in the database system does not include Exclusive lock held or Lock pending. That is, the foregoing original value does not indicate that the state of the target lock on any PN is Exclusive lock held or Lock pending. In this way, the first PN can successfully acquire the shared lock for the target lock.

Optionally, step 202 may include:

The first PN uses the target lock to perform the operation of acquiring an exclusive lock on the target data object.

That the first PN determines, when the original value meets the condition for a successful lock acquiring operation, that the lock acquiring operation is successful in step 203 may include:

The first PN determines whether a state, which is recorded in the original value, of the target lock on each PN in the database system is a state of allowing acquiring a shared lock, and, if the state, which is recorded in the original value, of the target lock on each PN in the database system is the state of allowing acquiring a shared lock, determines that the operation of acquiring an exclusive lock is successful; or that the first PN determines, when the original value meets the condition for a successful lock acquiring operation, that the lock acquiring operation is successful in step 203 may include: the first PN determines whether the state, which is recorded by the original value, of the target lock on the first PN is Shared lock held; if the state, which is recorded by the original value, of the target lock on the first PN is Shared lock held, determines whether the state, which is recorded in the original value, of the target lock on the another PN is No lock held; and, if the state, which is recorded in the original value, of the target lock on the another PN is No lock held, determines that the operation of acquiring an exclusive lock is successful, where the another PN is all PNs other than the first PN in the database system, and the state of allowing acquiring a shared lock is any one state of a No lock held state and a Shared lock held state.

That is, the foregoing condition for a successful lock acquiring operation may include:

The state, which is indicated by the original value, of the target lock on each PN in the database system is No lock held or Shared lock held; or the state, which is indicated by the original value, of the target lock on the first PN is Shared lock held and a state of the target lock on the another PN is No lock held, where the another PN is the all PNs other than the first PN in the database system. The original value does not include Exclusive lock held or Lock pending, or the original value does not include Shared lock held except that the state of using the target lock on the first PN is Shared lock held. In this way, the first PN can successfully acquire the exclusive lock for the target lock.

Optionally, if it is determined that the lock acquiring operation is successful, the current PN can perform an operation such as reading, modification, and deletion on data corresponding to the target lock.

Optionally, step 204 may include:

When the original value does not meet the condition for a successful lock acquiring operation, the first PN determines that the lock acquiring operation fails and updates the value of the data bit that is in the original value and used to indicate the state of the target lock on the first PN to the value that is used to indicate that the state of the target lock on the first PN is Lock pending.

Optionally, to prevent the another PN from performing the lock operation on the target lock in a process in which the current PN performs the lock operation on the target, step 204 may be the same as step 203. The foregoing FAA operation may also be used to update the value of the data bit that is in the lock operand and used to indicate the state of the target lock on the first PN to the value that is used to indicate that the state of the target lock on the first PN is Lock pending in step 204. That is, step 204 may include:

When the original value does not meet the condition for a successful lock acquiring operation, the first PN determines that the lock acquiring operation fails and uses the FAA operation to use the value of the data bit that is in the lock operand and used to indicate the state of the target lock on the first PN to indicate the value that indicates that the state of the target lock on the first PN is Lock pending. A value added in the FAA operation is a value contrary to the first value. That is, when the foregoing first value is 01, the value added in the FAA operation is −01. When the foregoing first value is 10, the value added in the FAA operation is −10. In this way, it is ensured that the used value of the lock operand is the latest during the update executed in step 204.

As an optional implementation manner, step 202 may include:

When the state of the target lock on the first PN is Shared lock held state, the first PN uses the target lock to perform the operation of acquiring an exclusive lock on the target data object, that is, acquires the exclusive lock based on the foregoing shared lock.

Optionally, step 203 may include: the first PN acquires an original value of the lock operand at a moment when the target lock is used to perform the operation of acquiring an exclusive lock on the target data object, and adds the value of the data bit that is in the original value and used to indicate the state of the target lock on the first PN and a preset second value to obtain an updated value of the lock operand; and when the original value meets a condition for successfully acquiring an exclusive lock, the first PN determines that the operation of acquiring an exclusive lock is successful and updates the value of the data bit that is in the updated value and used to indicate the state of the target lock on the first PN to a value that is used to indicate that the state of the target lock on the first PN is Exclusive lock held.

Optionally, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing second value may be 10. The foregoing updating the value of the data bit that is in the updated value and used to indicate the state of the target lock on the first PN to the value that is used to indicate that the target lock is on the first PN is Exclusive lock held may be adding the value of the data bit that is in the updated value and used to indicate the state of the target lock on the first PN and −01.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing step 202 may include:

The first PN performs the operation of acquiring a shared lock on the target lock.

Step 203 may include:

The first PN performs the FAA operation on the foregoing lock operand, where the value added in the FAA operation is $4^i$ (that is, the foregoing first value, which can also be understood as a value that is used to indicate the Shared lock held state, for example, 01). The first PN acquires the original value of the lock operand at the moment when the target lock is used to perform the lock acquiring operation on the target data object, and obtains a value obtained by the FAA operation (that is, the foregoing updated value). The value is acquired by adding the foregoing original value of the foregoing lock operand and a value of $4^i$, and indicates that the state of the target lock on the first PN is Shared lock held. That is, a value 01 is obtained by adding the value 00 of the data bit that is in the original value and used to indicate the state of the target lock on the first PN and 01.

When the state, which is indicated by the original value, of the target lock on each PN in the database system is the foregoing state of allowing acquiring a shared lock, the shared lock is successfully acquired, and the value of the data bit that is in the updated value and used to indicate the state of the target lock on the first PN is used as the value that is used to indicate that the state of the target lock on the first PN is lock held in step 203.

When states, which are indicated by the original value, of the target lock on various PNs in the database system include Lock pending or Exclusive lock held, step 204 is executed. Step 204 may include:

The first PN performs the FAA operation on the foregoing lock operand, where the value added in the FAA operation is $2 \times 4^i$, to obtain the value of the foregoing lock operand at a moment when step 204 is executed and obtain a value obtained by the FAA operation. The value is acquired by adding the value of the foregoing lock operand at the moment when step 204 is executed and a value of $2 \times 4^i$, and indicates that the state of the target lock on the first PN is Lock pending. That is, a value 11 is obtained by adding data 01 in a first position and 10.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, step 202 may include:

When the state of the target lock on the first PN is No lock held state, the first PN uses the target lock to perform the operation of acquiring an exclusive lock on the target data object.

Step 203 may include:

The first PN performs the FAA operation on the foregoing lock operand, where the value added in the FAA operation is $2 \times 4^i$ (that is, the foregoing first value, which can also be understood as a value that is used to indicate an Exclusive lock held state, for example, 10), to obtain the original value of the lock operand and obtain a value obtained by the FAA operation (that is, the foregoing updated value). The value is the foregoing original value of the foregoing lock operand and a value of $2 \times 4^i$, and indicates that the state of the target lock on the first PN is Exclusive lock held. That is, a value 11 is obtained by adding the data bit 01 that is in the lock operand and used to indicate the state of the target lock on the first PN and 10.

When the state, which is indicated by the original value, of the target lock on each PN in the database system is the foregoing state of allowing acquiring a shared lock, or when the state, which is indicated by the original value, of the target lock on the first PN is Shared lock held and the state of the target lock on the another PNs is No lock held, it is determined that the exclusive lock is successfully acquired, and the value of the data bit that is in the updated value and used to indicate the state of the target lock on the first PN is updated to the value that is used to indicate that the state of the target lock on the first PN is Exclusive lock held in step 203.

When states, which are indicated by the original value, of the target lock on various PNs in the database system include Lock pending or Exclusive lock held, or when the state, which is indicated by the original value, of the target lock on the first PN is Shared lock held and a state on another PN or multiple another PNs is also Shared lock held, step 204 is executed. Step 204 may include:

The first PN performs the FAA operation on the foregoing lock operand, where the value added in the FAA operation is $4^i$, to obtain the value of the foregoing lock operand at the moment when step 204 is executed and obtain a value obtained by the FAA operation. The value is acquired by adding the value of the foregoing lock operand at the moment when step 204 is executed and a value of $4^i$, and indicates that the state of the target lock on the first PN is Lock pending. That is, a value 11 is obtained by adding the value 01 of the data bit that is in the lock operand and used to indicate the state of the target lock on the first PN and 10.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, step 202 may include:

When the state of the target lock on the first PN is Shared lock held state, the first PN uses the target lock to perform the operation of acquiring an exclusive lock on the target data object.

Step 203 may include:

The first PN performs the FAA operation on the foregoing lock operand, where the value added in the FAA operation is $2 \times 4^i$ (that is, the foregoing second value, which can also be understood as a value that is used to indicate an Exclusive lock held state, for example, 10), to obtain the original value of the lock operand and obtain a value obtained by the FAA operation (that is, the foregoing updated value). The value is acquired by adding the foregoing original value of the foregoing lock operand and a value of $2 \times 4^i$, and indicates that the state of the target lock on the first PN is Lock pending. That is, a value of 11 is obtained by adding the value 01 of the data bit that is in the lock operand and used to indicate the state of the target lock on the first PN and 10.

When the state, which is indicated by the original value, of the target lock on each PN in the database system is the foregoing state of allowing acquiring a shared lock, or when the state, which is indicated by the original value, of the target lock on the first PN is Shared lock held and a state of the target lock on the another PN is No lock held, it is determined that the exclusive lock is successfully acquired. After the foregoing second value is added in step 203, the value of the data bit that is in the lock operand and used to indicate the state of the target lock on the first PN is a value that is used to indicate a Lock pending state (that is, 11). The value of the data bit that is in the updated value and used to indicate the state of the target lock on the first PN is updated to the value that is used to indicate that the state of the target lock on the first PN is Exclusive lock held in step 203.

That is, the first PN performs the FAA operation on the foregoing lock operand, where the value added in the FAA operation is $-4^i$ (that is, 01 is subtracted). That is, the value of the data bit that is in the lock operand and used to indicate the state of the target lock on the first PN is updated from the value that is used to indicate the Lock pending state (that is, 11) to the value that is used to indicate the Exclusive lock held state (that is, 10).

When states, which are indicated by the original value, of the target lock on various PNs in the database system include Lock pending or Exclusive lock held, or when the state, which is indicated by a value at a current moment, of the target lock is Shared lock held on the first PN and a state of the target lock on another PN or multiple another PNs is Shared lock held, the exclusive lock fails to be acquired in step 202. After the value that is used to indicate the Exclusive lock held state is added in step 203, the value of the data bit that is in the lock operand and used to indicate the state of the target lock on the first PN is the value that is used to indicate the Lock pending state (that is, 11). Therefore, step 204 may not be included in this embodiment.

In this embodiment, the exclusive lock can be acquired on a basis of the Shared lock held state.

As an optional implementation manner, step 201 may include:

The first PN receives, from a central coordinator node in the database system, the lock operand of the target lock.

Optionally, in this implementation manner, when the first PN needs to perform an operation such as adding, reading, modification, or deletion on a data object corresponding to the target lock, the first PN may send a request message for requesting an operation on the target lock to the CN. After receiving the message, the CN queries the lock operand of the target lock by querying in a Hash table. When lock operation information about the target lock does not exist in the Hash table, the CN creates the lock operand of the target lock and returns the lock operand to a node device.

As an optional implementation manner, step 201 may include:

The first PN receives the lock operand of the target lock. The second PN refers to any PN other than the first PN in the database system.

As an optional implementation manner, step 201 may include:

The first PN reads the lock operand, which is locally stored on the current PN, of the target lock.

In the foregoing technical solution, a lock acquiring operation is described in detail on a basis of the foregoing embodiment, and availability of a database system can be improved.

Figure 3:
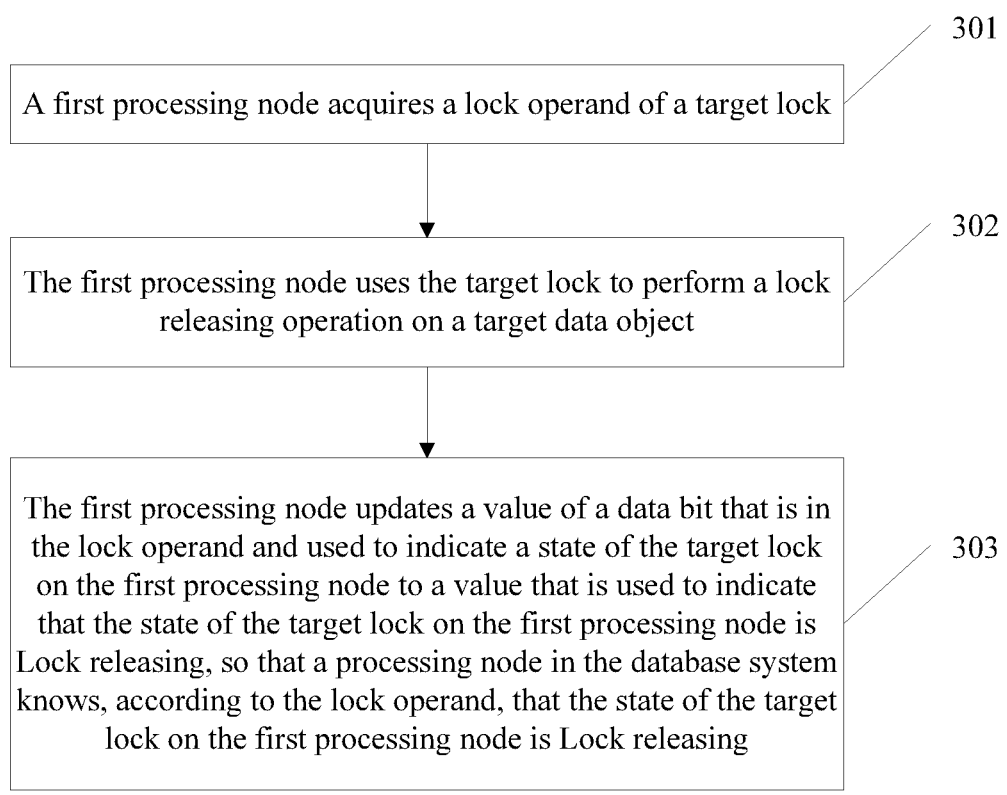
FIG. 3 is a schematic flowchart of another database system lock operation method according to an embodiment of the present invention.

FIG. 3 is a schematic flowchart of another database system lock operation method according to an embodiment of the present invention. As shown in FIG. 3, the method includes:

301: A first PN acquires a lock operand of a target lock, where the lock operand is used to record a current state of the target lock on each PN in the database system, and the current state of the target lock on each PN in the database system is represented by one or more data bits in the lock operand.

Optionally, the foregoing first PN may be any PN in the database system. The foregoing target lock is any lock in the foregoing system, such as a group lock and a page lock.

Optionally, in the embodiment of the present invention, a state of the target lock on a PN may include at least one of the following: No lock held, Shared lock held, Exclusive lock held, and Lock pending. A state value in the foregoing lock operand indicates a state of using the target lock on a PN.

302: The first PN uses the target lock to perform a lock releasing operation on a target data object.

303: The first PN updates a value of a data bit that is in the lock operand and used to indicate a state of the target lock on the first PN to a value that is used to indicate that the state of the target lock on the first PN is lock released, so that a PN in the database system knows, according to the lock operand, that the state of the target lock on the first PN is lock released.

Optionally, the foregoing lock released state may be understood as a No lock held state.

As an optional implementation manner, a device of implementing the present invention, that is, the PN, may be any node device in the database system, such as a computer and a node device in a network, for example, a base station and a controller device.

In the foregoing technical solution, a first PN acquires a lock operand of a target lock, where the lock operand is used to record a current state of the target lock on each PN in the database system, and the current state of the target lock on each PN in the database system is represented by one or more data bits in the lock operand; the first PN uses the target lock to perform a lock releasing operation on a target data object; and the first PN updates a value of a data bit that is in the lock operand and used to indicate a state of the target lock on the first PN to a value that is used to indicate that the state of the target lock on the first PN is lock released, so that a PN in the database system knows, according to the lock operand, that the state of the target lock on the first PN is lock released. In this way, an entire lock operation process is independently completed by the first PN, which makes a CN free from processing a lock message, thereby improving performance of the database system.

Figure 4:
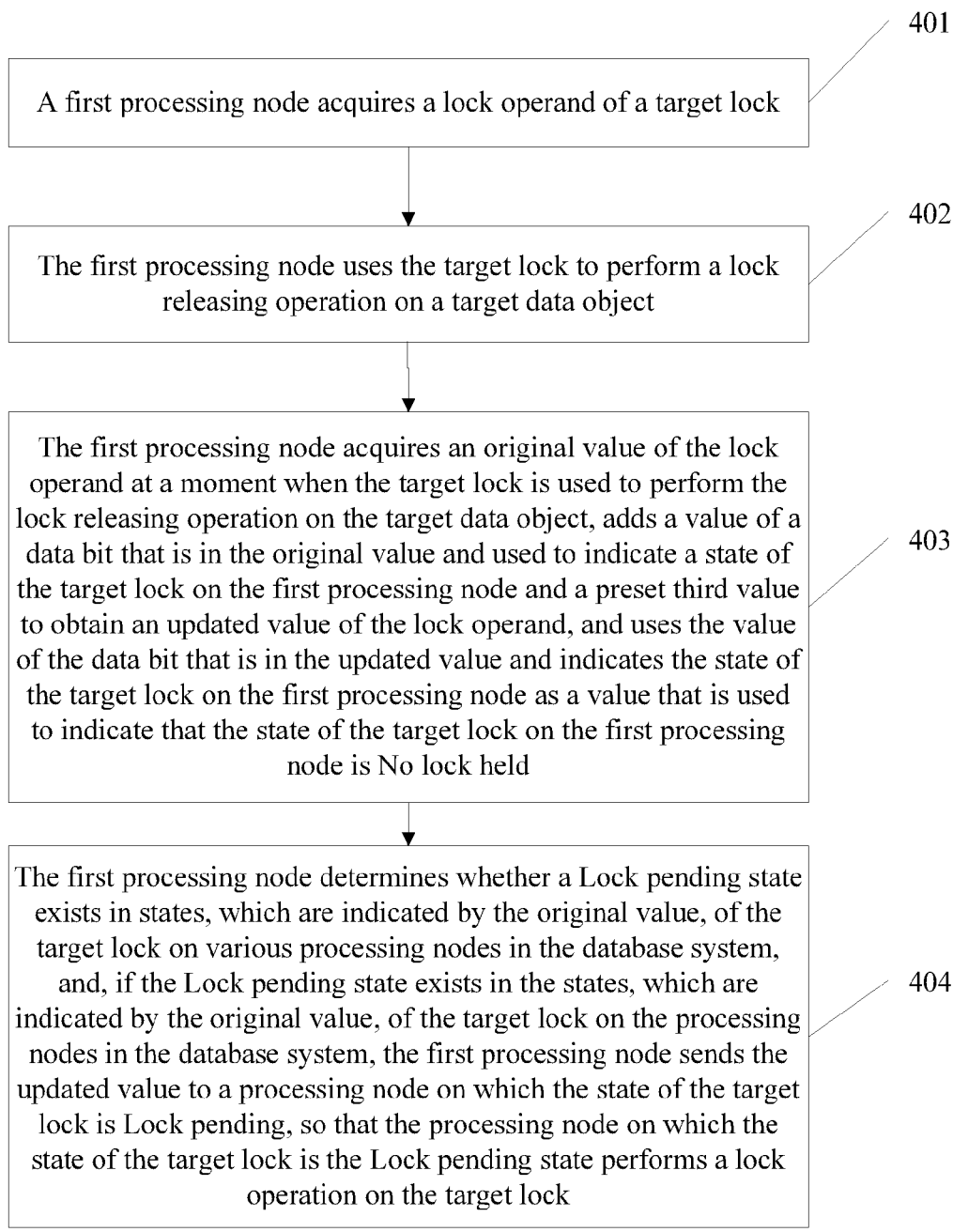
FIG. 4 is a schematic flowchart of another database system lock operation method according to an embodiment of the present invention.

FIG. 4 is a schematic flowchart of another database system lock operation method according to an embodiment of the present invention. As shown in FIG. 4, the method includes:

401: A first PN acquires a lock operand of a target lock, where the lock operand is used to record a current state of the target lock on each PN in the database system, and the current state of the target lock on each PN in the database system is represented by one or more data bits in the lock operand.

As an optional implementation manner, the foregoing lock operand may be a group of M-bit binary numerals, where M is the number of bits of an operating system of a PN. For example, M is 32 for a 32-bit operating system. For example, if an operating system is 128, M is 128.

Optionally, in this implementation manner, if the number of PNs in the foregoing database system is N, and N and M meet N=M/2, the foregoing lock operand may include data of N 2-bit binary numeral. Data of one 2-bit binary numeral indicates a state of the target lock on one PN, that is, the current state of the target lock on each PN in the database system is represented by data of one 2-bit binary numeral in the lock operand.

Optionally, a node identifier may be set for each PN in the foregoing system. Therefore, a mapping relationship between a position of a binary numeral in the lock operand and a node identifier may be established in the embodiment of the present invention. For example, if node identifiers of the foregoing N PNs are 0123 . . . N, the foregoing mapping relationship may be that data of bits 0 and 1 in the lock operand may indicate a state of the target lock on a PN whose node identifier is 0, data of bits 2 and 3 in the lock operand may indicate a state of the target lock on a PN whose node identifier is 1, data of bits 3 and 4 in the lock operand may indicate a state of the target lock on a PN whose node identifier is 2, data of bits 5 and 6 in the lock operand may indicate a state of the target lock on a PN whose node identifier is 3, . . . , and data of bits N−1 and N in the lock operand may indicate a state of the target lock on a PN whose node identifier is N. For example, if a node identifier of the first PN is 0, a binary numeral in bits 0 and 1 in the lock operand indicates a state of the target lock on the first PN. Certainly, the foregoing node identifiers and the foregoing mapping relationship are only used as one example in the embodiment of the present invention. The embodiment of the present invention includes, but is not limited to, the foregoing listed node identifiers and mapping relationship.

Optionally, a state of the target lock on a PN may include at least one of the following: No lock held, Shared lock held, Exclusive lock held, and Lock pending. In the embodiment of the present invention, a mapping relationship between a value of a binary numeral and a lock state may also be established. The mapping relationship may be shown as follows:

| Lock Operand (2 Bits) | Lock State |
|---|---|
| 00 | No lock held |
| 01 | Shared lock held |
| 10 | Exclusive lock held |
| 11 | Lock pending |

The foregoing table only shows a 2-bit binary numeral, indicating a state of the target lock on one PN. For example, the 2-bit binary numeral in the table is bits 0 and 1, that is, the 2-bit binary numeral in the table indicates the state of the target lock on the PN whose node identifier is 0. When the 2-bit binary numeral in the table is 01, the state of the target lock on the PN whose node identifier is 0 is Shared lock held. When the 2-bit binary numeral in the table is 10, the state of the target lock on the PN whose node identifier is 0 is Exclusive lock held. Certainly, the embodiment of the present invention includes, but is not limited to, the foregoing listed mapping relationship between a value of a binary numeral and a lock state.

402: The first PN uses the target lock to perform a lock releasing operation on a target data object.

As an optional implementation manner, the foregoing lock releasing operation may include: an operation of releasing a shared lock or an operation of releasing an exclusive lock.

403: The first PN acquires an original value of the lock operand at a moment when the target lock is used to perform the lock releasing operation on the target data object, adds a value of a data bit that is in the original value and used to indicate the state of the target lock on the first PN and a preset third value to obtain an updated value of the lock operand, and uses the value of the data bit that is in the updated value and indicates the state of the target lock on the first PN as a value that is used to indicate that the state of the target lock on the first PN is No lock held.

For example, as shown in the foregoing mapping relationship, the foregoing third value may be −01 or −10. In this way, when the shared lock is released in step 402, the foregoing third value is −01. When the exclusive lock is released in step 402, the foregoing third value is −10. Therefore, the obtained value of the data bit that is in the updated value and indicates the state of the target lock on the first PN is 00.

Optionally, when the mapping relationship between a position of a binary numeral in the lock operand and a node identifier meets the foregoing listed mapping relationship, and the mapping relationship between a value of a binary numeral and a lock state meets the mapping relationship shown in the foregoing table, the operation of releasing the shared lock is performed in step 402. In this case, the original value of the foregoing lock operand and $-4^i$ are added, that is, only one $W-4^i$ needs to be executed in step 403, where $4^i$ is a binary numeral (for example, $4^0=0001$, $4^1=0100$, $4^2=010000$), i is the node identifier of the first PN, and W is the original value of the foregoing lock operand. For example, when the node identifier of the first PN is 0, 0001 is subtracted from W in step 402. When the node identifier of the first PN is 1, 0100 is subtracted from W in step 402. It should be noted that, in this implementation manner, calculation is performed only according to the foregoing listed mapping relationship, and an algorithm in step 403 may change accordingly when the foregoing mapping relationship changes.

Optionally, if the operation of releasing the exclusive lock is performed in step 402, the original value of the foregoing lock operand and $-2\times4^i$ are added, that is, only one $W-2\times4^i$ needs to be executed in step 403, where $-2\times4^i$ is a binary numeral, i is the node identifier of the first PN, and W is the original value of the foregoing lock operand. For example, when the node identifier of the first PN is 0, 0010 is subtracted from W in step 402. When the node identifier of the first PN is 1, 1000 is subtracted from W in step 402. It should be noted that, in this implementation manner, calculation is performed only according to the foregoing listed mapping relationship, and an algorithm in step 403 may change accordingly when the foregoing mapping relationship changes.

Optionally, an FAA operation in atomic operations may be used in step 403. Because content of the FAA operation is an atomic operation that adds an original value of an operand and a value and returns the original value, the original value of the foregoing lock operand can be acquired by using the operation in step 403. In addition, the foregoing third value, for example, the foregoing $-4^i$, is added in the FAA operation. That is, the foregoing updated value can be obtained only by executing one $W-4^i$ in step 403, where i is a node identifier of a current PN, and W is the original value of the foregoing lock operand.

As an optional implementation manner, after step 403, the method may further include:

404: The first PN determines whether a Lock pending state exists in states, which are indicated by the original value, of the target lock on various PNs in the database system, and, if the Lock pending state exists in the states, which are indicated by the original value, of the target lock on the PNs in the database system, the first PN sends the updated value to a PN on which the state of the target lock is Lock pending, so that the PN on which the state of the target lock is the Lock pending state performs a lock operation on the target lock.

Optionally, the foregoing PN on which the state of the target lock is Lock pending means that the state of the target lock on the PN is Lock pending. In this way, in step 404, the updated value is then sent to the PN on which the state of the target lock is Lock pending, without passing through a CN, thereby saving overhead of the CN.

In another embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing step 402 may include:

The first PN performs the operation of releasing the shared lock on the target lock.

Step 403 may include:

The first PN performs the FAA operation on the foregoing lock operand, where a value added in the FAA operation is $-4^i$ (that is, the foregoing third value, which can also be understood as a value that is used to indicate releasing of the shared lock, for example, −01), to obtain the original value of the lock operand and obtain a value obtained by the FAA operation (that is, the foregoing updated value). The value is acquired by adding the foregoing original value of the foregoing lock operand and a value of $-4^i$, and indicates that the state of the target lock on the first PN is No lock held. That is, a value 00 is obtained by subtracting 01 from the value 01 of the data bit that is in the lock operand and used to indicate the state of the target lock on the first PN.

In another embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing step 402 may include:

The first PN performs the operation of releasing the exclusive lock on the target lock.

Step 403 may include:

The first PN performs the FAA operation on the foregoing lock operand, where a value added in the FAA operation is $-2 \times 4^i$ (that is, the foregoing third value, which can also be understood as a value that is used to indicate releasing of the exclusive lock, for example, −10), to obtain the original value of the lock operand and obtain a value obtained by the FAA operation (that is, the foregoing updated value). The value is acquired by adding the foregoing original value of the foregoing lock operand and a value of $-2 \times 4^i$, and indicates that the state of the target lock on the first PN is No lock held. That is, a value 00 is obtained by subtracting 10 from the value 10 of the data bit that is in the lock operand and used to indicate the state of the target lock on the first PN.

As an optional implementation manner, step 401 may include:

The first PN receives, from a central coordinator node in the database system, the lock operand of the target lock.

As an optional implementation manner, step 401 may include:

The first PN receives, from a second PN in the database system, the lock operand of the target lock, where the second PN refers to any PN other than the first PN in the database system, for example, the lock operand sent in step 302.

As an optional implementation manner, step 401 may include:

The first PN reads the lock operand, which is locally stored on the first PN, of the target lock.

In the foregoing technical solution, a lock releasing operation is described in detail on a basis of the foregoing embodiment, and availability of a database system can be improved.

The following are apparatus embodiments of the present invention. The apparatus embodiments of the present invention are used to execute the implementation methods of embodiments 1 to 4 of the present invention. For ease of description, only parts related to the embodiments of the present invention are shown. For specific technical details that are not disclosed, reference may be made to embodiments 1 to 4 of the present invention.

Figure 5:
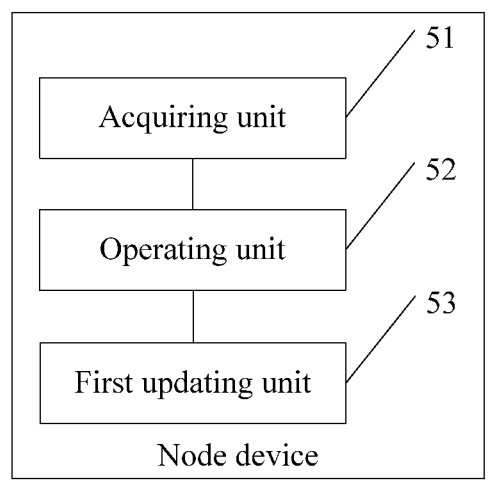
FIG. 5 is a schematic structural diagram of a node device according to an embodiment of the present invention.

FIG. 5 is a schematic structural diagram of a node device according to an embodiment of the present invention. The node device is a PN in a database system, as shown in FIG. 5, including an acquiring unit 51, an operating unit 52, and a first updating unit 53.

The acquiring unit 51 is configured to acquire a lock operand of a target lock, where the lock operand is used to record a current state of the target lock on each PN in the database system, and the current state of the target lock on each PN in the database system is represented by one or more data bits in the lock operand.

Optionally, the foregoing node device may be any PN in the database system, and the foregoing target lock may be any lock in the foregoing system.

Optionally, in the embodiment of the present invention, a state of the target lock on a PN may include at least one of the following: No lock held, Shared lock held, Exclusive lock held, and Lock pending. A state value in the foregoing lock operand indicates a state of using the target lock on a PN.

The operating unit 52 is configured to use the target lock to perform a lock acquiring operation on a target data object.

The first updating unit 53 is configured to, when the lock operand meets a condition for a successful lock acquiring operation, determine that the lock acquiring operation is successful and update a value of a data bit that is in the lock operand and used to indicate a state of the target lock on the node device to a value that is used to indicate that the state of the target lock on the node device is lock held.

As an optional implementation manner, the foregoing node device may be any node device in the database system, such as a computer and a node device in a network, for example, a base station and a controller device.

In the foregoing technical solution, a node device acquires a lock operand of a target lock, where the lock operand is used to record a current state of the target lock on each PN in the database system, and the current state of the target lock on each PN in the database system is represented by one or more data bits in the lock operand; the node device uses the target lock to perform a lock acquiring operation on a target data object; and, when the lock operand meets a condition for a successful lock acquiring operation, the node device determines that the lock acquiring operation is successful and updates a value of a data bit that is in the lock operand and used to indicate a state of the target lock on the node device to a value that is used to indicate that the state of the target lock on the node device is lock held. In this way, an entire lock operation process is independently completed by a first PN, which makes a CN free from processing a lock message, thereby improving performance of the database system.

Figure 6:
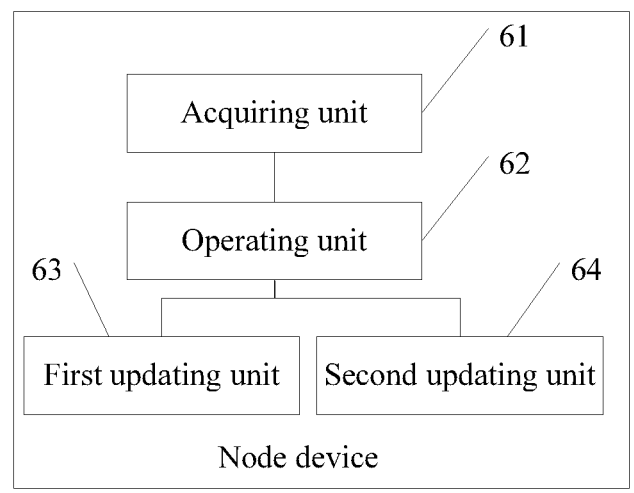
FIG. 6 is a schematic structural diagram of another node device according to an embodiment of the present invention.

FIG. 6 is a schematic structural diagram of another node device according to an embodiment of the present invention. The node device is a PN in a database system, as shown in FIG. 6, including an acquiring unit 61, an operating unit 62, and a first updating unit 63.

The acquiring unit 61 is configured to acquire a lock operand of a target lock, where the lock operand is used to record a current state of the target lock on each PN in the database system, and the current state of the target lock on each PN in the database system is represented by one or more data bits in the lock operand.

As an optional implementation manner, the foregoing lock operand may be a group of M-bit binary numerals, where M is the number of bits of an operating system of a PN. For example, M is 32 for a 32-bit operating system. For example, if an operating system is 128, M is 128.

Optionally, in this implementation manner, if the number of PNs in the foregoing database system is N, and N and M meet N=M/2, the foregoing lock operand may include data of N 2-bit binary numeral. Data of one 2-bit binary numeral indicates a state of the target lock on one PN, that is, the current state of the target lock on each PN in the database system is represented by data of one 2-bit binary numeral in the lock operand.

Optionally, a node identifier may be set for each PN in the foregoing system. Therefore, a mapping relationship between a position of a binary numeral in the lock operand and a node identifier may be established in the embodiment of the present invention. For example, if node identifiers of the foregoing N PNs are 0123 . . . N, the foregoing mapping relationship may be that data of bits 0 and 1 in the lock operand may indicate a state of the target lock on a PN whose node identifier is 0, data of bits 2 and 3 in the lock operand may indicate a state of the target lock on a PN whose node identifier is 1, data of bits 3 and 4 in the lock operand may indicate a state of the target lock on a PN whose node identifier is 2, data of bits 5 and 6 in the lock operand may indicate a state of the target lock on a PN whose node identifier is 3, . . . , and data of bits N−1 and N in the lock operand may indicate a state of the target lock on a PN whose node identifier is N. For example, if a node identifier of a first PN is 0, a binary numeral in bits 0 and 1 in the lock operand indicates a state of the target lock on the first PN. Certainly, the foregoing node identifiers and the foregoing mapping relationship are only used as one example in the embodiment of the present invention. The embodiment of the present invention includes, but is not limited to, the foregoing listed node identifiers and mapping relationship.

Optionally, a state of the target lock on a PN may include at least one of the following: No lock held, Shared lock held, Exclusive lock held, and Lock pending. In the embodiment of the present invention, a mapping relationship between a value of a binary numeral and a lock state may also be established. The mapping relationship may be shown as follows:

| Lock Operand (2 Bits) | Lock State |
| --- | --- |
| 00 | No lock held |
| 01 | Shared lock held |
| 10 | Exclusive lock held |
| 11 | Lock pending |

The foregoing table only shows a 2-bit binary numeral, indicating a state of the target lock on one PN. For example, the 2-bit binary numeral in the table is bits 0 and 1, that is, the 2-bit binary numeral in the table indicates the state of the target lock on the PN whose node identifier is 0. When the 2-bit binary numeral in the table is 01, the state of the target lock on the PN whose node identifier is 0 is Shared lock held. When the 2-bit binary numeral in the table is 10, the state of the target lock on the PN whose node identifier is 0 is Exclusive lock held. Certainly, the embodiment of the present invention includes, but is not limited to, the foregoing listed mapping relationship between a value of a binary numeral and a lock state.

The operating unit 62 is configured to use the target lock to perform a lock acquiring operation on a target data object.

As an optional implementation manner, the foregoing lock acquiring operation may include: an operation of acquiring a shared lock or an operation of acquiring an exclusive lock.

The first updating unit 63 is configured to, when the lock operand meets a condition for a successful lock acquiring operation, determine that the lock acquiring operation is successful and update a value of a data bit that is in the lock operand and used to indicate a state of the target lock on the node device to a value that is used to indicate that the state of the target lock on the node device is lock held.

As an optional implementation manner, the node device may further include: a second updating unit 64 configured to, when the lock operand does not meet the condition for a successful lock acquiring operation, determine that the lock acquiring operation fails and update the value of the data bit that is in the lock operand and used to indicate the state of the target lock on the node device to a value that is used to indicate that the state of the target lock on the node device is Lock pending.

In this way, it can be implemented that when the lock acquiring operation fails, the state of the target lock on the first PN can be updated to Lock pending.

As an optional implementation manner, the first updating unit 63 may further include: a first calculating unit (not shown in the accompanying drawing) configured to acquire an original value of the lock operand at a moment when the target lock is used to perform the lock acquiring operation on the target data object, and add the value of the data bit that is in the original value and used to indicate the state of the target lock on the node device and a preset first value to obtain an updated value of the lock operand; and a first determining unit (not shown in the accompanying drawing) configured to, when the original value meets the condition for a successful lock acquiring operation, determine that the lock acquiring operation is successful and use the value of the data bit that is in the updated value and used to indicate the state of the target lock on the node device as the value that is used to indicate that the state of the target lock on the node device is lock held.

Optionally, when the mapping relationship between a position of a binary numeral in the lock operand and a node identifier meets the foregoing listed mapping relationship, and the mapping relationship between a value of a binary numeral and a lock state meets the mapping relationship shown in the foregoing table, the foregoing first value may be 01 or 10.

Optionally, if the operating unit 62 performs the operation of acquiring a shared lock, the first updating unit 63 may obtain the foregoing updated value by adding the original value of the foregoing lock operand and $4^i$, that is, only by executing one $W+4^i$, where, $4^i$ is a binary numeral (for example, $4^0$0001, $4^1$=0100, $4^2$=010000), i is the node identifier of the first PN, and W is the original value of the foregoing lock operand. For example, when the node identifier of the first PN is 0, 0001 is added to W. When the node identifier of the first PN is 1, 0100 is added to W. It should be noted that, in this implementation manner, calculation is performed only according to the foregoing listed mapping relationship, and an algorithm of the first updating unit 63 may change accordingly when the foregoing mapping relationship changes.

Optionally, the operating unit 62 may be further configured to use the target lock to perform the operation of acquiring a shared lock on the target data object.

The first determining unit (not shown in the accompanying drawing) may be further configured to determine whether a state, which is recorded in the original value, of the target lock on each PN in the database system is a state of allowing acquiring a shared lock, and, if the state, which is recorded in the original value, of the target lock on each PN in the database system is the state of allowing acquiring a shared lock, determine that the operation of acquiring a shared lock is successful, where the state of allowing acquiring a shared lock is any one state of a No lock held state and a Shared lock held state.

That is, the foregoing condition for a successful lock acquiring operation may include:

The state, which is indicated by the original value, of the target lock on each PN in the database system is the foregoing state of allowing acquiring a shared lock, that is, No lock held or Shared lock held. That is, the state, which is indicated by the foregoing original value, of the target lock on each PN in the database system is either No lock held or Shared lock held. The state, which is indicated by the foregoing original value, of the target lock on each PN in the database system does not include Exclusive lock held or Lock pending. That is, the foregoing original value does not indicate that the state of the target lock on any PN is Exclusive lock held or Lock pending. In this way, the first PN can successfully acquire the shared lock for the target lock.

Optionally, the operating unit 62 may be further configured to use the target lock to perform the operation of acquiring an exclusive lock on the target data object.

The first determining unit (not shown in the accompanying drawing) may be further configured to determine whether a state, which is recorded in the original value, of the target lock on each PN in the database system is a state of allowing acquiring a shared lock, and, if the state, which is recorded in the original value, of the target lock on each PN in the database system is the state of allowing acquiring a shared lock, determine that the operation of acquiring an exclusive lock is successful; or the first determining unit (not shown in the accompanying drawing) may be further configured to determine whether the state, which is recorded by the original value, of the target lock on the node device is Shared lock held; if the state, which is recorded by the original value, of the target lock on the node device is Shared lock held, determine whether a state, which is recorded in the original value, of the target lock on another PN is No lock held; and, if the state, which is recorded in the original value, of the target lock on the another PN is No lock held, determine that the operation of acquiring an exclusive lock is successful, where the another PN is all PNs other than the node device in the database system, where the state of allowing acquiring a shared lock is any one state of a No lock held state and a Shared lock held state.

That is, the foregoing condition for a successful lock acquiring operation may include:

The state, which is indicated by the original value, of the target lock on each PN in the database system is No lock held or Shared lock held; or the state, which is indicated by the original value, of the target lock is Shared lock held on the first PN and the state of the target lock on the anther PN is No lock held, where the another PN is the all PNs other than the first PN in the database system. The original value does not include Exclusive lock held or Lock pending, or the original value does not include Shared lock held except that the state of using the target lock on the first PN is Shared lock held. In this way, the first PN can successfully acquire the exclusive lock for the target lock.

Optionally, if it is determined that the lock acquiring operation is successful, a current PN can perform an operation such as reading, modification, and deletion on data corresponding to the target lock.

Optionally, the second updating unit 64 may be further configured to, when the original value does not meet the condition for a successful lock acquiring operation, determine that the lock acquiring operation fails and update the value of the data bit that is in original value and used to indicate the state of the target lock on the node device to the value that is used to indicate that the state of the target lock on the node device is Lock pending.

Optionally, to prevent the another PN from performing a lock operation on the target lock in a process in which the current PN performs the lock operation on the target, the second updating unit 64 may be the same as the first updating unit 63. The second updating unit 64 may also use the foregoing FAA operation to update the value of the data bit that is in the lock operand and used to indicate the state of the target lock on the node device to the value that is used to indicate that the state of the target lock on the node device is Lock pending. That is, the second updating unit 64 may be further configured to, when the original value does not meet the condition for a successful lock acquiring operation, determine that the lock acquiring operation fails and use the FAA operation to update the value of the data bit that is in the lock operand and used to indicate the state of the target lock on the node device to the value that is used to indicate that the state of the target lock on the node device is Lock pending. A value added in the FAA operation is a value contrary to the first value. That is, when the foregoing first value is 01, the value added in the FAA operation is −01. When the foregoing first value is 10, the value added in the FAA operation is −10. In this way, it is ensured that the value of the used lock operand is the latest during the update executed by the second updating unit 64.

As an optional implementation manner, the operating unit 62 may be further configured to, when the state of the target lock on the node device is Shared lock held, use the target lock to perform the operation of acquiring an exclusive lock on the target data object, that is, acquire the exclusive lock based on the shared lock.

Optionally, the first updating unit 63 may further include: a second calculating unit (not shown in the accompanying drawing) configured to acquire the original value of the lock operand at a moment when the target lock is used to perform the operation of acquiring an exclusive lock on the target data object, and add the value of the data bit that is in the original value and used to indicate the state of the target lock on the node device and a preset second value to obtain an updated value of the lock operand; and a second determining unit (not shown in the accompanying drawing) configured to, when the original value meets a condition for successfully acquiring an exclusive lock, determine that the operation of acquiring an exclusive lock is successful and update the value of the data bit that is in the updated value and used to indicate the state of the target lock on the node device to a value that is used to indicate that the state of the target lock on the node device is Exclusive lock held.

Optionally, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing second value may be 10. The foregoing updating the value of the data bit that is in the updated value and used to indicate the state of the target lock on the node device to the value that is used to indicate that the state of the target lock on the node device is Exclusive lock held may be adding the value of the data bit that is in the updated value and used to indicate the state of the target lock on the node device and −01.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the foregoing operating unit 62 may be further configured for the first PN to perform the operation of acquiring a shared lock on the target lock.

The first updating unit 63 may be further configured to perform the FAA operation on the foregoing lock operand, where the value added in the FAA operation is $4^i$ (that is, the foregoing first value, which can also be understood as a value that is used to indicate the Shared lock held state, for example, 01). The node device acquires the original value of the lock operand at a moment when the target lock is used to perform the lock acquiring operation on the target data object, and obtain a value obtained by the FAA operation (that is, the foregoing updated value). The value is acquired by adding the foregoing original value of the foregoing lock operand and a value of $4^i$, and indicates that the state of the target lock on the first PN is Shared lock held. That is, a value 01 is obtained by adding the value 00 of the data bit that is in the original value and used to indicate the state of the target lock on the node device and 01.

When the state, which is indicated by the original value, of the target lock on each PN in the database system is the foregoing state of allowing acquiring a shared lock, the first updating unit 63 successfully acquires the shared lock and uses the value of the data bit that is in the updated value and used to indicate the state of the target lock on node device as the value that is used to indicate that the state of the target lock on the node device is lock held.

When states, which are indicated by the original value, of the target lock on various PNs in the database system include Lock pending or Exclusive lock held, the second updating unit 64 performs the FAA operation on the foregoing lock operand, where the value added in the FAA operation is $2 \times 4^i$, to obtain the value of the foregoing lock operand at a moment when the second updating unit 64 is executed and obtain a value obtained by the FAA operation. The value is acquired by adding the value of the foregoing lock operand at the moment when the second updating unit 64 is executed and a value of $2 \times 4^i$, and indicates that the state of the target lock on the first PN is Lock pending. That is, a value 11 is obtained by adding data 01 in a first position and 10.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the operating unit 62 may be further configured to, when the state of the target lock on the node device is No lock held, use the target lock to perform the operation of acquiring an exclusive lock on the target data object.

The first updating unit 63 may be further configured to perform the FAA operation on the foregoing lock operand, where the value added in the FAA operation is $2 \times 4^i$ (that is, the foregoing first value, which can also be understood as a value that is used to indicate an Exclusive lock held state, for example, 10), to obtain the original value of the lock operand and obtain a value obtained by the FAA operation (that is, the foregoing updated value). The value is acquired by adding the foregoing original value of the foregoing lock operand and a value of $2 \times 4^i$, and indicates that the state of the target lock on the first PN is Exclusive lock held. That is, a value 11 is obtained by adding the value 01 of the data bit that is in the lock operand and used to indicate the state of the target lock on the node device and 10.

When the state, which is indicated by the original value, of the target lock on each PN in the database system is the foregoing state of allowing acquiring a shared lock, or when the state, which is indicated by the original value, of the target lock on the node device is Shared lock held and a state of the target lock on the another PN is No lock held, the first updating unit 63 determines that the exclusive lock is successfully acquired and updates the value of the data bit that is in the updated value and used to indicate the state of the target lock on the node device to the value that is used to indicate that the state of the target lock on the node device is Exclusive lock held.

When states, which are indicated by the original value, of the target lock on various PNs in the database system include Lock pending or Exclusive lock held, or when the state, which is indicated by the original value, of the target lock on the first PN is Shared lock held and a state on another PN or multiple another PNs is also Shared lock held, the second updating unit 64 is executed. The second updating unit 64 may be further configured to perform the FAA operation on the foregoing lock operand, where the value added in the FAA operation is $4^i$, to obtain the value of the foregoing lock operand at a moment when the second updating unit 64 determines that the lock acquiring operation fails and obtain a value obtained by the FAA operation. The value is acquired by adding the value of the foregoing lock operand at a moment when the second updating unit 64 determines that the lock acquiring operation fails and a value of $4^i$, and indicates that the state of the target lock on the first PN is Lock pending. That is, a value 11 is obtained by adding the value 01 of the data bit that is in the lock operand and used to indicate the state of the target lock on the node device and 10.

In another optional embodiment, when the mapping relationship between a position of a binary numeral in the lock operand and a node identifier meets the foregoing listed mapping relationship (that is, the mapping relationship that bits 0 and 1 in the lock operand may indicate the state of using the target lock on the PN whose node identifier is 0), and the mapping relationship between a value of a binary numeral and a lock state meets the mapping relationship shown in the foregoing table, the operating unit 62 may be further configured to, when the state of the target lock on the node device is Shared lock held, use the target lock to perform the operation of acquiring an exclusive lock on the target data object.

The first updating unit 63 may be further configured to perform the FAA operation on the foregoing lock operand, where the value added in the FAA operation is $2 \times 4^i$ (that is, the foregoing second value, which can also be understood as a value that is used to indicate an Exclusive lock held state, for example, 10), to obtain the original value of the lock operand and obtain a value obtained by the FAA operation (that is, the foregoing updated value). The value is acquired by adding the foregoing original value of the foregoing lock operand and a value of $2 \times 4^i$, and indicates that the state of the target lock on the first PN is Lock pending. That is, a value 11 is obtained by adding the value 01 of the data bit that is in the lock operand and used to indicate the state of the target lock on the node device and 10.

When the state, which is indicated by the original value, of the target lock on each PN in the database system is the foregoing state of allowing acquiring a shared lock, or when the state, which is indicated by the original value, of the target lock on the first PN is Shared lock held and a state of the target lock on the another PN is No lock held, it is determined that the exclusive lock is successfully acquired. After the first updating unit 63 adds the foregoing second value, the value of the data bit that is in the lock operand and used to indicate the state of the target lock on the node device is the value that is used to indicate a Lock pending state (that is, 11). Therefore, the first updating unit 63 updates the value of the data bit that is in the updated value and used to indicate the state of the target lock on the node device to the value that is used to indicate that the state of the target lock on the node device is Exclusive lock held.

That is, the FAA operation is performed on the foregoing lock operand, where the value added in the FAA operation is $-4^i$ (that is, 01 is subtracted). That is, the value of the data bit that is in the lock operand and used to indicate the state of the target lock on the node device is updated from the value that is used to indicate the Lock pending state (that is, 11) to the value that is used to indicate the Exclusive lock held state (that is, 10).

When states, which are indicated by the original value, of the target lock on various PNs in the database system include Lock pending or Exclusive lock held, or when the state, which is indicated by a value at a current moment, of the target lock on the node device is Shared lock held and a state of the target lock on another PN or on multiple another PNs is Shared lock held, the operating unit 62 fails to acquire the exclusive lock. After the first updating unit 63 adds the value that is used to indicate the Exclusive lock held state, the value of the data bit that is in the lock operand and used to indicate the state of the target lock on the node device is the value that is used to indicate the Lock pending state (that is, 11). Therefore, the second updating unit 64 may not be included in this embodiment.

In this embodiment, the exclusive lock can be acquired on a basis of the Shared lock held state.

As an optional implementation manner, the acquiring unit 61 may be further configured to receive, from a central coordinator node in the database system, the lock operand of the target lock.

Optionally, in this implementation manner, when the node device needs to perform an operation such as adding, reading, modification, or deletion on a data object corresponding to the target lock, the node device may send a request message for requesting an operation on the target lock to the CN. After receiving the message, the obtained by queries the lock operand of the target lock by querying in a Hash table. When lock operation information about the target lock does not exist in the Hash table, the CN creates the lock operand of the target lock and returns the lock operand to the node device.

As an optional implementation manner, the acquiring unit 61 may be further configured to receive, from a second PN in the database system, the lock operand of the target lock. for example, a transfer message in step 305 in the foregoing method embodiment. The second PN refers to any PN other than the node device in the database system.

As an optional implementation manner, the acquiring unit 61 may be further configured to read the lock operand, which is locally stored on the node device, of the target lock.

In the foregoing technical solution, a lock acquiring operation is described in detail on a basis of the foregoing embodiment, and availability of a database system can be improved.

Figure 7:
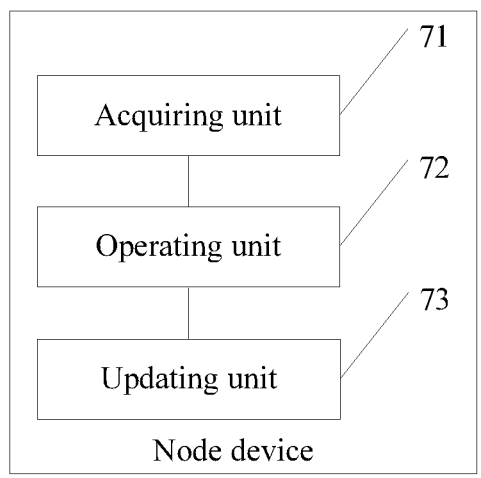
FIG. 7 is a schematic structural diagram of another node device according to an embodiment of the present invention.

FIG. 7 is a schematic structural diagram of another node device according to an embodiment of the present invention. The node device is a PN in a database system, as shown in FIG. 7, including an acquiring unit 71, an operating unit 72, and an updating unit 73.

The acquiring unit 71 is configured to acquire a lock operand of a target lock, where the lock operand is used to record a current state of the target lock on each PN in the database system, and the current state of the target lock on each PN in the database system is represented by one or more data bits in the lock operand.

The operating unit 72 is configured to use the target lock to perform a lock releasing operation on a target data object.

The updating unit 73 is configured to update a value of a data bit that is in the lock operand and used to indicate a state of the target lock on the node device to a value that is used to indicate that the state of the target lock on the node device is lock released, so that a PN in the database system knows, according to the lock operand, that the state of the target lock on the node device is lock released.

As an optional implementation manner, a device of implementing the present invention, that is, the PN, may be any node device in the database system, such as a computer and a node device in a network, for example, a base station and a controller device.

In the foregoing technical solution, a node device acquires a lock operand of a target lock, where the lock operand is used to record a current state of the target lock on each PN in a database system, and the current state of the target lock on each PN in the database system is represented by one or more data bits in the lock operand; the node device uses the target lock to perform a lock releasing operation on a target data object; and the node device updates a value of a data bit that is in the lock operand and used to indicate a state of the target lock on the node device to a value that is used to indicate that the state of the target lock on the node device is lock released, so that a PN in the database system knows, according to the lock operand, that the state of the target lock on the node device is lock released. In this way, an entire lock operation process is independently completed by a first PN, which makes a CN free from processing a lock message, thereby improving performance of the database system.

Figure 8:
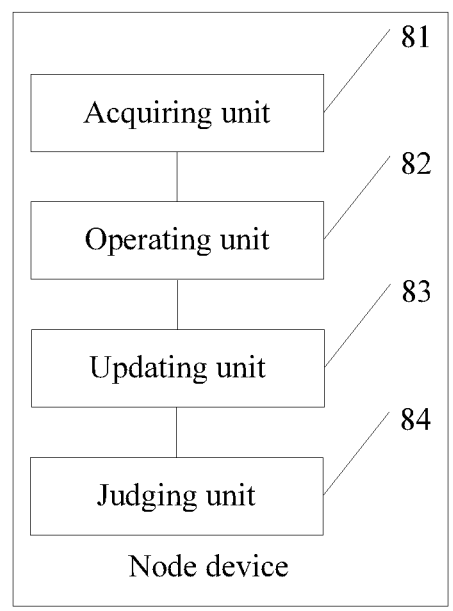
FIG. 8 is a schematic structural diagram of another node device according to an embodiment of the present invention.

FIG. 8 is a schematic structural diagram of another node device according to an embodiment of the present invention. The node device is a PN in a database system, as shown in FIG. 8, including an acquiring unit 81, an operating unit 82, and an updating unit 83.

The acquiring unit 81 is configured to acquire a lock operand of a target lock, where the lock operand is used to record a current state of the target lock on each PN in the database system, and the current state of the target lock on each PN in the database system is represented by one or more data bits in the lock operand.

As an optional implementation manner, the foregoing lock operand may be a group of M-bit binary numerals, where M is the number of bits of an operating system of a PN. For example, M is 32 for a 32-bit operating system. For example, if an operating system is 128, M is 128.

Optionally, in this implementation manner, if the number of PNs in the foregoing database system is N, and N and M meet N=M/2, the foregoing lock operand may include data of N 2-bit binary numeral. Data of one 2-bit binary numeral indicates a state of the target lock on one PN, that is, the current state of the target lock on each PN in the database system is represented by data of one 2-bit binary numeral in the lock operand.

The operating unit 82 is configured to use the target lock to perform a lock releasing operation on a target data object.

As an optional implementation manner, the foregoing lock releasing operation may include: an operation of releasing a shared lock or an operation of releasing an exclusive lock.

The updating unit 83 is configured to acquire an original value of the lock operand at a moment when the target lock is used to perform the lock releasing operation on the target data object, add a value of a data bit that is in the original value and used to indicate a state of the target lock on the node device and a preset third value to obtain an updated value of the lock operand, and use the value of the data bit that is in the updated value and indicates the state of the target lock on the node device as a value that is used to indicate that the state of the target lock on the node device is No lock held.

For example, as shown in the mapping relationship described in the foregoing embodiments, the foregoing third value may be −01 or −10. In this way, when the operating unit 82 releases the shared lock, the foregoing third value is −01. When the operating unit 82 releases the exclusive lock, the foregoing third value is −10. Therefore, the obtained value of the data bit that is in the updated value and indicates the state of the target lock on the node device is 00.

As an optional implementation manner, the node device may further include: a judging unit 84 configured to determine whether a Lock pending state exists in states, which are indicated by the original value, of the target lock on various PNs in the database system. If the Lock pending state exists in the states, which are indicated by the original value, of the target lock on the PNs in the database system, the node device sends the updated value to a PN on which the state of the target lock is Lock pending, so that the PN on which the state of the target lock is the Lock pending state performs a lock operation on the target lock.

Optionally, the foregoing PN on which the state of the target lock is Lock pending means that the state of the target lock on the PN is Lock pending. In this way, the judging unit 84 then sends the updated value to the PN on which the state of the target lock is Lock pending, without passing through a CN, thereby saving overhead of the CN.

In another embodiment, when a mapping relationship between a position of a binary numeral in the lock operand and a node identifier meets the foregoing listed mapping relationship (that is, a mapping relationship that bits 0 and 1 in the lock operand may indicate a state of using the target lock on a PN whose node identifier is 0), and a mapping relationship between a value of a binary numeral and a lock state meets the mapping relationship shown in the foregoing table, the foregoing operating unit 82 may be further configured to perform the operation of releasing the shared lock on the target lock.

The updating unit 83 may be further configured to perform an FAA operation on the foregoing lock operand, where a value added in the FAA operation is $-4^i$ (that is, the foregoing third value, which can also be understood as a value that is used to indicate releasing of the shared lock, for example, −01), to obtain the original value of the lock operand and obtain a value obtained by the FAA operation (that is, the foregoing updated value). The value is acquired by adding the foregoing original value of the foregoing lock operand and a value of $-4^i$, and indicates that a state of the target lock on a first PN is No lock held. That is, a value 00 is obtained by subtracting 01 from the value 01 of the data bit that is in the lock operand and used to indicate the state of the target lock on the node device.

In another embodiment, when a mapping relationship between a position of a binary numeral in the lock operand and a node identifier meets the foregoing listed mapping relationship (that is, a mapping relationship that bits 0 and 1 in the lock operand may indicate a state of using the target lock on a PN whose node identifier is 0), and a mapping relationship between a value of a binary numeral and a lock state meets the mapping relationship shown in the foregoing table, the foregoing operating unit 82 may be further configured to perform the operation of releasing the exclusive lock on the target lock.

The updating unit 83 may be further configured to perform an FAA operation on the foregoing lock operand, where a value added in the FAA operation is $-2 \times 4^i$ (that is, the foregoing third value, which can also be understood as a value that is used to indicate releasing of the exclusive lock, for example, −01), to obtain the original value of the lock operand and obtain a value (that is, the foregoing updated value). The value is acquired by adding the foregoing original value of the foregoing lock operand and a value of $-2 \times 4^i$, and indicates that a state of the target lock on a first PN is No lock held. That is, a value 00 is obtained by subtracting 10 from the value 10 of the data bit that is in the lock operand and used to indicate the state of the target lock on the node device.

As an optional implementation manner, the acquiring unit 81 may be further configured to receive, from a central coordinator node in the database system, the lock operand of the target lock.

As an optional implementation manner, the acquiring unit 81 may be further configured to receive, from a second PN in the database system, the lock operand of the target lock, where the second PN refers to any PN other than the node device in the database system.

As an optional implementation manner, the acquiring unit 81 may be further configured to read the lock operand, which is locally stored on the node device, of the target lock.

In the foregoing technical solution, a lock releasing operation is described in detail on a basis of the foregoing embodiment, and availability of a database system can be improved.

Figure 9:
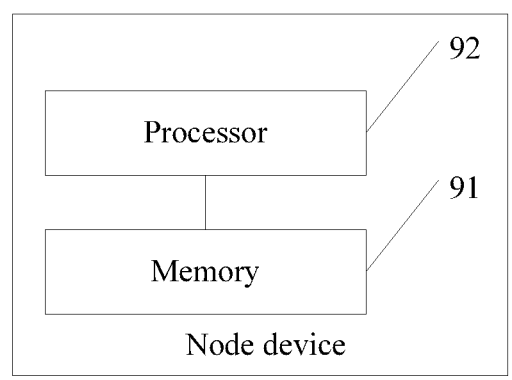
FIG. 9 is a schematic structural diagram of another node device according to an embodiment of the present invention.

FIG. 9 is a schematic structural diagram of another node device according to an embodiment of the present invention. The node device is a PN in a database system, as shown in FIG. 9, including a memory 91 and a processor 92.

The memory 91 is configured to store a group of program codes. The processor 92 is configured to adjust the program codes stored by the memory 91 and is configured to execute the following operations: acquiring a lock operand of a target lock, where the lock operand is used to record a current state of the target lock on each PN in the database system, and the current state of the target lock on each PN in the database system is represented by one or more data bits in the lock operand; using the target lock to perform a lock acquiring operation on a target data object; and when the lock operand meets a condition for a successful lock acquiring operation, determining that the lock acquiring operation is successful and updating a value of a data bit that is in the lock operand and used to indicate a state of the target lock on the node device to a value that is used to indicate that the state of the target lock on the node device is lock held.

As an optional implementation manner, a device of implementing the present invention, that is, the PN, may be any node device in the database system, such as a computer and a node device in a network, for example, a base station and a controller device.

In the foregoing technical solution, a node device acquires a lock operand of a target lock, where the lock operand is used to record a current state of the target lock on each PN in a database system, and the current state of the target lock on each PN in the database system is represented by one or more data bits in the lock operand; the node device uses the target lock to perform a lock acquiring operation on a target data object; and, when the lock operand meets a condition for a successful lock acquiring operation, the node device determines that the lock acquiring operation is successful and updates a value of a data bit that is in the lock operand and used to indicate a state of the target lock on the node device to a value that is used to indicate that the state of target lock on the node device is lock held. In this way, an entire lock operation process is independently completed by the node device, which makes a CN free from processing a lock message, thereby improving performance of the database system.

Figure 10:
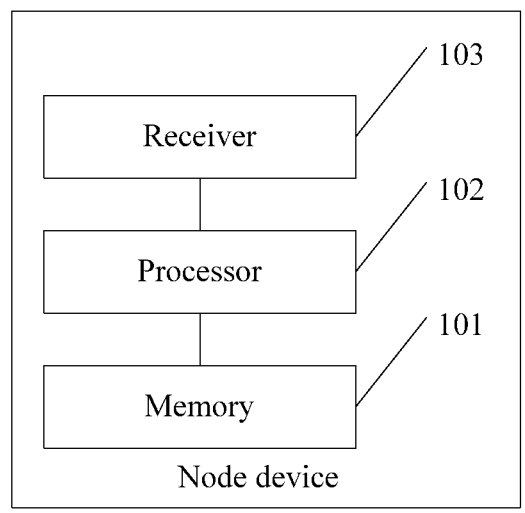
FIG. 10 is a schematic structural diagram of another node device according to an embodiment of the present invention.

FIG. 10 is a schematic structural diagram of another node device according to an embodiment of the present invention. The node device is a PN in a database system, as shown in FIG. 10, including a memory 101 and a processor 102.

The memory 101 is configured to store a group of program codes. The processor 102 is configured to adjust the program codes stored by the memory 101 and is configured to execute the following operations: acquiring a lock operand of a target lock, where the lock operand is used to record a current state of the target lock on each PN in the database system, and the current state of the target lock on each PN in the database system is represented by one or more data bits in the lock operand; using the target lock to perform a lock acquiring operation on a target data object; and when the lock operand meets a condition for a successful lock acquiring operation, determining that the lock acquiring operation is successful and updating a value of a data bit that is in the lock operand and used to indicate a state of the target lock on the node device to a value that is used to indicate that the state of the target lock on the node device is lock held; or when the lock operand does not meet a condition for a successful lock acquiring operation, determining that the lock acquiring operation fails and updating a value of a data bit that is in the lock operand and used to indicate a state of the target lock on the node device to a value that is used to indicate that the state of the target lock on the node device is Lock pending.

In this way, when the lock acquiring operation fails, the state of the target lock on a first PN can be updated to Lock pending.

As an optional implementation manner, the operations, which are executed by the processor 102 when the lock operand meets the condition for a successful lock acquiring operation, of determining that the lock acquiring operation is successful and updating the value of the data bit that is in the lock operand and used to indicate the state of the target lock on the node device to the value that is used to indicate that the state of the target lock on the node device is lock held may include: acquiring an original value of the lock operand at a moment when the target lock is used to perform the lock acquiring operation on the target data object, and adding the value of the data bit that is in the original value and used to indicate the state of the target lock on the node device and a preset first value to obtain an updated value of the lock operand; and when the original value meets the condition for a successful lock acquiring operation, determining that the lock acquiring operation is successful and using the value of the data bit that is in the updated value and used to indicate the state of the target lock on the node device as the value that is used to indicate that the state of the target lock on the node device is lock held.

Optionally, the operation, which is executed by the processor 102, of using the target lock to perform the lock acquiring operation on the target data object may include: using the target lock to perform an operation of acquiring a shared lock on the target data object; and the operation, which is executed by the processor 102 when the original value meets the condition for a successful lock acquiring operation, of determining that the lock acquiring operation is successful may include: determining whether a state, which is recorded in the original value, of the target lock on each PN in the database system is a state of allowing acquiring a shared lock, and, if the state, which is recorded in the original value, of the target lock on each PN in the database system is the state of allowing acquiring a shared lock, determining that the operation of acquiring a shared lock is successful, where the state of allowing acquiring a shared lock is any one state of a No lock held state and a Shared lock held state.

Optionally, the operation, which is executed by the processor 102, of using the target lock to perform the lock acquiring operation on the target data object may include: using the target lock to perform an operation of acquiring an exclusive lock on the target data object; and the operation, which is executed by the processor 102, that the node device determines, when the original value meets the condition for a successful lock acquiring operation, that the lock acquiring operation is successful may include: determining whether a state, which is recorded in the original value, of the target lock on each PN in the database system is a state of allowing acquiring a shared lock, and, if the state, which is recorded in the original value, of the target lock on each PN in the database system is the state of allowing acquiring a shared lock, determining that the operation of acquiring an exclusive lock is successful; or determining whether a state, which is recorded in the original value, of the target lock on the node device is Shared lock held; if the state, which is recorded by the original value, of the target lock on the node device is Shared lock held, determining whether a state, which is recorded in the original value, of the target lock on another PN is No lock held; and, if the state, which is recorded in the original value, of the target lock on the another PN is No lock held, determining that the operation of acquiring an exclusive lock is successful, where the another PN is all PNs other than the node device in the database system, and the state of allowing acquiring a shared lock is any one state of a No lock held state and a Shared lock held state.

Optionally, if it is determined that the lock acquiring operation is successful, a current PN can perform an operation such as reading, modification, and deletion on data corresponding to the target lock.

Optionally, the operations, which are executed by the processor 102 when the lock operand does not meet the condition for a successful lock acquiring operation, of determining that the lock acquiring operation fails and updating the value of the data bit that is in the lock operand and used to indicate the state of the target lock on the node device to the value that is used to indicate that the state of the target lock on the node device is Lock pending may include: when the original value does not meet the condition for a successful lock acquiring operation, determining that the lock acquiring operation fails and updating the value of the data bit that is in the original value and used to indicate the state of the target lock on the node device to the value that is used to indicate that the state of the target lock on the node device is Lock pending.

As an optional implementation manner, the operation, which is executed by the processor 102, of using the target lock to perform the lock acquiring operation on the target data object may include: using, when the state of the target lock on the node device is Shared lock held, the target lock to perform an operation of acquiring an exclusive lock on the target data object, that is, acquiring the exclusive lock based on a shared lock.

Optionally, the operations, which are executed by the processor 102 when the lock operand meets the condition for a successful lock acquiring operation, of determining that the lock acquiring operation is successful and updating the value of the data bit that is in the lock operand and used to indicate the state of the target lock on the node device to the value that is used to indicate that the state of the target lock on the node device is lock held may include: acquiring an original value of the lock operand at a moment when the target lock is used to perform the operation of acquiring an exclusive lock on the target data object, and adding the value of the data bit that is in the original value and used to indicate the state of the target lock on the node device and a preset second value to obtain an updated value of the lock operand; and when the original value meets a condition for successfully acquiring an exclusive lock, determining that the operation of acquiring an exclusive lock is successful and updating the value of the data bit that is in the updated value and used to indicate the state of the target lock on the node device to a value that is used to indicate that the state of the target lock on the node device is Exclusive lock held.

Optionally, when a mapping relationship between a position of a binary numeral in the lock operand and a node identifier meets the foregoing listed mapping relationship (that is, a mapping relationship that bits 0 and 1 in the lock operand may indicate a state of using the target lock on a PN whose node identifier is 0), and a mapping relationship between a value of a binary numeral and a lock state meets the mapping relationship shown in the foregoing table, the foregoing second value may be 10. The foregoing updating the value of the data bit that is in the updated value and used to indicate the state of the target lock on the node device to the value that is used to indicate that the state of the target lock on the node device is Exclusive lock held may be adding the value of the data bit that is in the updated value and used to indicate the state of the target lock on the node device and −01.

Optionally, the processor 102 may update, by using the FAA operation described in the foregoing embodiments, the value of the data bit that is in the lock operand and used to indicate the state of the target lock on the node device, and details are not described herein again.

As an optional implementation manner, the node device may further include: a receiver 103 configured to receive, from a central coordinator node in the database system, the lock operand of the target lock, where the operation, which is executed by the processor 102, of acquiring the lock operand of the target lock may include: controlling the receiver 103 to receive, from the central coordinator node in the database system, the lock operand of the target lock.

Optionally, in this implementation manner, when the node device needs to perform an operation such as adding, reading, modification, or deletion on a data object corresponding to the target lock, the node device may send a request message for requesting an operation on the target lock to the CN. After receiving the message, the obtained by queries the lock operand of the target lock by querying in a Hash table. When lock operation information about the target lock does not exist in the Hash table, the CN creates the lock operand of the target lock and returns the lock operand to the node device.

As an optional implementation manner, the node device may further include: the receiver 103, further configured to receive, from a second PN in the database system, the lock operand of the target lock, where the second PN refers to any PN other than the current PN in the database system; and the operation, which is executed by the processor 102, of acquiring the lock operand of the target lock may include: controlling the receiver 103 to receive, from the another PN in the database system, the lock operand of the target lock.

As an optional implementation manner, the operation, which is executed by the processor 102, of acquiring the lock operand of the target lock may include: reading the locally stored lock operand of the target lock.

In the foregoing technical solution, a lock acquiring operation is described in detail on a basis of the foregoing embodiment, and availability of a database system can be improved.

Figure 11:
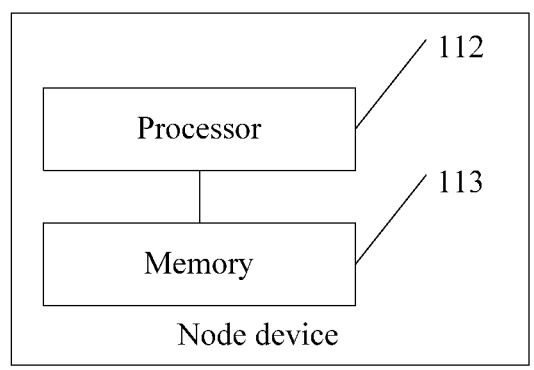
FIG. 11 is a schematic structural diagram of another node device according to an embodiment of the present invention.

FIG. 11 is a schematic structural diagram of another node device according to an embodiment of the present invention. The node device is a PN in a database system, as shown in FIG. 11, including a memory 111 and a processor 112.

The memory 111 is configured to store a group of program codes. The processor 112 is configured to adjust the program codes stored by the memory 111 and is configured to execute the following operations: acquiring a lock operand of a target lock, where the lock operand is used to record a current state of the target lock on each PN in the database system, and the current state of the target lock on each PN in the database system is represented by one or more data bits in the lock operand; using the target lock to perform a lock releasing operation on a target data object; and updating a value of a data bit that is in the lock operand and used to indicate a state of the target lock on the node device to a value that is used to indicate that the state of the target lock on the node device is lock released, so that a PN in the database system knows, according to the lock operand, that the state of the target lock on the node device is lock released.

As an optional implementation manner, the foregoing node device may be any node device in the database system, such as a computer and a node device in a network, for example, a base station and a controller device.

In the foregoing technical solution, a node device acquires a lock operand of a target lock, where the lock operand is used to record a current state of the target lock on each PN in a database system, and the current state of the target lock on each PN in the database system is represented by one or more data bits in the lock operand; the node device uses the target lock to perform a lock releasing operation on a target data object; and the node device updates a value of a data bit that is in the lock operand and used to indicate a state of the target lock on the node device to a value that is used to indicate that the state of the target lock on the node device is lock released, so that a PN in the database system knows, according to the lock operand, that the state of the target lock on the node device is lock released. In this way, an entire lock operation process is independently completed by the node device, which makes a CN free from processing a lock message, thereby improving performance of the database system.

Figure 12:
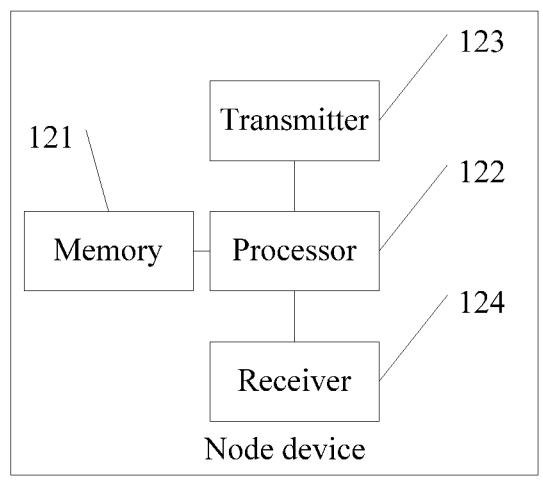
FIG. 12 is a schematic structural diagram of another node device according to an embodiment of the present invention.

FIG. 12 is a schematic structural diagram of another node device according to an embodiment of the present invention. The node device is a PN in a database system, as shown in FIG. 12, including a memory 121, a processor 122, and a transmitter 123.

The memory 121 is configured to store a group of program codes. The processor 122 is configured to adjust the program codes stored by the memory 121 and is configured to execute the following operations: acquiring a lock operand of a target lock, where the lock operand is used to record a current state of the target lock on each PN in the database system, and the current state of the target lock on each PN in the database system is represented by one or more data bits in the lock operand; using the target lock to perform a lock releasing operation on a target data object; and acquiring an original value of the lock operand at a moment when the target lock is used to perform the lock releasing operation on the target data object, adding a value of a data bit that is in the original value and used to indicate a state of the target lock on the node device and a preset third value to obtain an updated value of the lock operand, and using the value of the data bit that is in the updated value and indicates the state of the target lock on the node device as a value that is used to indicate that the state of the target lock on the node device is No lock held; and determining whether a Lock pending state exists in states, which are indicated by the original value, of the target lock on various PNs in the database system, and, if the Lock pending state exists in the states, which are indicated by the original value, of the target lock on the PNs in the database system, using the transmitter 123 to send the updated value to a PN on which the state of the target lock is Lock pending, so that the PN on which the state of the target lock is the Lock pending state performs a lock operation on the target lock.

Optionally, the processor 122 may obtain the foregoing original value and the foregoing updated value by using the FAA operation described in the foregoing embodiments, and details are not described herein again.

As an optional implementation manner, the node device may further include: a receiver 124 configured to receive, from a central coordinator node in the database system, the lock operand of the target lock, where the operation, which is executed by the processor 122, of acquiring the lock operand of the target lock may include: controlling the receiver 124 to receive, from the central coordinator node in the database system, the lock operand of the target lock.

Optionally, in this implementation manner, when the node device needs to perform an operation such as adding, reading, modification, or deletion on a data object corresponding to the target lock, the node device may send a request message for requesting an operation on the target lock to the CN. After receiving the message, the obtained by queries the lock operand of the target lock by querying in a Hash table. When lock operation information about the target lock does not exist in the Hash table, the CN creates the lock operand of the target lock and returns the lock operand to the node device.

As an optional implementation manner, the node device may further include: the receiver 124, further configured to receive, from a second PN in the database system, the lock operand of the target lock, where the second PN refers to any PN other than a current PN in the database system; and the operation, which is executed by the processor 122, of acquiring the lock operand of the target lock may include: controlling the receiver 124 to receive, from another PN in the database system, the lock operand of the target lock.

As an optional implementation manner, the operation, which is executed by the processor 124, of acquiring the lock operand of the target lock may include: reading the locally stored lock operand of the target lock.

In the foregoing technical solution, a lock releasing operation is described in detail on a basis of the foregoing embodiment, and availability of a database system can be improved.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing embodiments are exemplary embodiments of the present invention only and not intended to limit the protection scope of the present invention. Any modification, equivalent replacement, and improvement made without departing from the spirit and principle of the present invention shall fall within the protection scope of the present invention.

What is claimed is:

1. A database system lock operation method, comprising:
acquiring, by a first processing node, a lock operand of a target lock, wherein the lock operand is used to record a current state of the target lock on each processing node in a database system, and wherein the current state of the target lock on each processing node in the database system is represented by one or more data bits in the lock operand;
performing, by the first processing node, a lock acquiring operation on a target data object using the target lock;
acquiring, by the first processing node, an original value of the lock operand at a moment when the target lock is used to perform the lock acquiring operation on the target data object;
updating, by the first processing node, a value of a data bit in the lock operand that is in the original value and used to indicate the state of the target lock on the first processing node to the value that is used to indicate that the state of the target lock on the first processing node is lock held; and
determining, by the first processing node according to the lock operand, whether the lock acquiring operation is successful, wherein the lock acquiring operation is successful when the original value meets a condition for a successful lock acquiring operation, and wherein the lock acquiring operation fails when the original value does not meet a condition for a successful lock acquiring operation.

2. The method according to claim 1, wherein using the target lock to perform the lock acquiring operation on the target data object comprises using, by the first processing node, the target lock to perform an operation of acquiring a shared lock on the target data object, wherein updating the value of the data bit that is in the original value and used to indicate the state of the target lock on the first processing node to the value that is used to indicate that the state of the target lock on the first processing node is lock held comprises adding the value of the data bit that is in the original value and used to indicate the state of the target lock on the first processing node and a preset first value to obtain an updated value of the lock operand, wherein the value of the data bit that is in the updated value and used to indicate the state of the target lock on the first processing node is a value indicating that the state of the target lock on the first processing node is Shared lock held, wherein determining, by the first processing node when the original value meets the condition for the successful lock acquiring operation, that the lock acquiring operation is successful, and determining that the lock acquiring operation fails when the original value does not meet the condition for the successful lock acquiring operation comprises:
  determining, by the first processing node, whether a state, which is recorded in the original value, of the target lock on each processing node in the database system is a state of allowing acquiring a shared lock;
  determining that the operation of acquiring a shared lock is successful when the state, which is recorded in the original value, of the target lock on each processing node in the database system is the state of allowing acquiring a shared lock; and
  determining that the operation of acquiring a shared lock fails when the state, which is recorded in the original value, of the target lock on each processing node in the database system is not the state of allowing acquiring a shared lock, and
  wherein the state of allowing acquiring a shared lock is any one state of a No lock held state and a Shared lock held state.

3. The method according to claim 2, further comprising updating, when the first processing node determines that the lock acquiring operation fails, the value of the data bit that is in the updated value and used to indicate the state of the target lock on the first processing node to a value that is used to indicate that the state of the target lock on the first processing node is Lock pending.

4. The method according to claim 1, wherein using the target lock to perform the lock acquiring operation on the target data object comprises using, by the first processing node, the target lock to perform an operation of acquiring an exclusive lock on the target data object, wherein updating the value of the data bit that is in the original value and used to indicate the state of the target lock on the first processing node to the value that is used to indicate that the state of the target lock on the first processing node is lock held comprises adding the value of the data bit that is in the original value and used to indicate the state of the target lock on the first processing node and a preset second value to obtain an updated value of the lock operand, wherein the value of the data bit that is in the updated value and used to indicate the state of the target lock on the first processing node is a value indicating that the state of the target lock on the first processing node is Exclusive lock held, wherein determining, by the first processing node when the original value meets the condition for the successful lock acquiring operation, that the lock acquiring operation is successful and determining that the lock acquiring operation fails when the original value does not meet the condition for the successful lock acquiring operation comprises:
  determining, by the first processing node, whether a state, which is recorded in the original value, of the target lock on each processing node in the database system is a state of allowing acquiring a shared lock, wherein the operation of acquiring an exclusive lock is successful when the state is the state of allowing acquiring the shared lock, and wherein the operation of acquiring the exclusive lock fails when the state is not the state of the allowing acquiring the shared lock; or
  determining, by the first processing node, whether a state, which is recorded in the original value, of the target lock on the first processing node is Shared lock held and a state on another processing node is No lock held, wherein the operation of acquiring an exclusive lock is successful when the state of the target lock is Shared lock held on the first processing node and No lock held on the another processing node, wherein the operation of acquiring the exclusive lock fails when the state of the target lock is not Shared lock held on the first processing node or No lock held on the another processing node, wherein the another processing node is all processing nodes other than the first processing node in the database system, and wherein the state of allowing acquiring the shared lock is any one state of a No lock held state and a Shared lock held state.

5. The method according to claim 4, further comprising updating, when the first processing node determines that the lock acquiring operation fails, the value of the data bit that is in the updated value and used to indicate the state of the target lock on the first processing node to a value that is used to indicate that the state of the target lock on the first processing node is Lock pending.

6. A database system lock operation method, comprising:
  acquiring, by a first processing ode, a lock operand of a target lock, wherein the lock operand is used to record a current state of the target lock on each processing node in a database system, and the current state of the target lock on each processing node in the database system is represented by one or more data bits in the lock operand;
  performing, by the first processing node, a lock releasing operation on a target data object using the target lock;
  acquiring, by the first processing node, an original value of the lock operand at a moment when the target lock is used to perform the lock releasing operation on the target data object; and
  updating, by the first processing node, a value of a data bit that is in the lock operand and used to indicate a state of the target lock on the first processing node to an updated value that is used to indicate that the state of the target lock on the first processing node is No lock held, wherein the value of the data bit in the original value is added to a preset third value to obtain the updated value of the lock operand, wherein a processing node in the database system knows, according to the lock operand, that the state of the target lock on the first processing node is No lock held.

7. The method according to claim 6, wherein after using the value of the data bit that is in the updated value and used to indicate the state of the target lock on the first processing node as the value that is used to indicate that the state of the target lock on the first processing node is No lock held, the method further comprises:
  determining, by the first processing node, whether a Lock pending state exists in states, which are indicated by the original value, of the target lock on various processing nodes in the database system; and
  sending the updated value to a processing node on which the state of the target lock is Lock pending when the Lock pending state exists in the states are indicated by the original value, of the target lock on the processing nodes in the database system, wherein the processing node on which the state of the target lock is the Lock pending state performs a lock operation on the target lock.

8. A node device, comprising:
  a memory storing executable instructions; and a processor coupled to the memory, wherein the processor executes the instructions and causes the node device to:
acquire a lock operand of a target lock, wherein the lock operand is used to record a current state of the target lock on each processing node in a database system, wherein the database system is a database system in which the node device locates, and wherein the current state of the target lock on each processing node in the database system is represented by one or more data bits in the lock operand;
perform a lock acquiring operation on a target data object on the node device using the target lock;
acquire an original value of the lock operand at a moment when the target lock is used to perform the lock acquiring operation on the target data object on the node device;
update a value of a data bit in the lock operand that is in the original value and used to indicate the state of the target lock on the node device to the value that is used to indicate that the state of the target lock on the node device is lock held; and
determine, according to the lock operand, whether the lock acquiring operation is successful, wherein the lock acquiring operation is successful when the original value meets a condition for a successful lock acquiring operation, and wherein the lock acquiring operation fails when the original value does not meet a condition for a successful lock acquiring operation.

9. The node device according to claim 8, wherein the processor further causes the node device to:
use the target lock to perform an operation of acquiring a shared lock on the target data object;
add the value of the data bit that is in the original value and used to indicate the state of the target lock on the node device and a preset first value to obtain an updated value of the lock operand, wherein the value of the data bit that is in the updated value and used to indicate the state of the target lock on the node device is a value indicating that the state of the target lock on the node device is Shared lock held;
determine whether a state, which is recorded in the original value, of the target lock on each processing node in the database system is a state of allowing acquiring a shared lock;
determine that the operation of acquiring a shared lock is successful when the state, which is recorded in the original value, of the target lock on each processing node in the database system is the state of allowing acquiring a shared lock; and
determine that the lock acquiring operation fails when the state, which is recorded in the original value, of the target lock on each processing node in the database system is not the state of allowing acquiring a shared lock, and wherein the state of allowing acquiring a shared lock is any one state of a No lock held state and a Shared lock held state.

10. The node device according to claim 9, wherein the process further causes the node device to: update, when the lock acquiring operation fails, the value of the data bit that is in the updated value and used to indicate the state of the target lock on the node device to a value that is used to indicate that the state of the target lock on the node device is Lock pending.

11. The node device according to claim 8, wherein the processor further causes the node device to:
use the target lock to perform an operation of acquiring an exclusive lock on the target data object;
add the value of the data bit that is in the original value and used to indicate the state of the target lock on the node device and a preset second value to obtain an updated value of the lock operand, wherein the value of the data bit that is in the updated value and used to indicate the state of the target lock on the node device is a value indicating that the state of the target lock on the node device is Exclusive lock held;
determine whether a state, which is recorded in the original value, of the target lock on each processing node in the database system is a state of allowing acquiring a shared lock;
determine that the operation of acquiring an exclusive lock is successful when the state, which is recorded in the original value, of the target lock on each processing node in the database system is the state of allowing acquiring a shared lock;
determine that the operation of acquiring an exclusive lock fails when the state, which is recorded in the original value, of the target lock on each processing node in the database system is not the state of allowing acquiring a shared lock;
determine whether the state, which is recorded in the original value, of the target lock is Shared lock held on the node device and No lock held on another processing node;
determine that the operation of acquiring an exclusive lock is successful when the state, which is recorded in the original value, of the target lock is Shared lock held on the node device and No lock held on the another processing node; and
determine that the operation of acquiring an exclusive lock fails when the state, which is recorded in the original value, of the target lock is not Shared lock held on the node device or No lock held on the another processing node, and
wherein the another processing node is all processing nodes other than the node device in the database system, and wherein the state of allowing acquiring a shared lock is any one state of a No lock held state and a Shared lock held state.

12. The node device according to claim 11, wherein the processor further causes the node device to: update, when the lock acquiring operation fails, the value of the data bit that is in the updated value and used to indicate the state of the target lock on the node device to a value that is used to indicate that the state of the target lock on the node device is Lock pending.

13. A node device, comprising:
a memory storing executable instructions; and
a processor coupled to the memory, wherein the processor executes the instructions and causes the node device to:
acquire a lock operand of a target lock, the lock operand is used to record a current state of the target lock on each processing node in a database system, the database system is a database system in which the node device locates, and the current state of the target lock on each processing node in the database system is represented by one or more data bits in the lock operand;
perform a lock releasing operation on a target data object using the lock target;
acquire an original value of the lock operand at a moment when the target lock is used to perform the lock releasing operation on the target data object; and update a value of a data bit that is in the lock operand and used to indicate a state of the target lock on the node device to an updated value that is used to indicate that the state of the target lock on the node device is No lock held, wherein the value of the data hit in the original value is added to a preset third value to obtain the updated value of the lock operand, wherein a processing node in the database system knows, according to the lock operand, that the state of the target lock on the node device is No lock held.

14. The node device according to claim 13, wherein the processor further causes the node device to:
   determine, after updating the value of the data bit that is in the lock operand and used to indicate the at of the target lock on the node device to the value that is used to indicate that the state of the target lock on the node device is No lock held, whether a Lock pending state exists in states, which are indicated by the original value, of the target lock on various processing nodes in the database system; and
   send the updated value to a processing node on which the state of the target lock is Lock pending when the Lock pending state exists in the states, which are indicated by the original value, of the target lock on the processing nodes in the database system, wherein the processing node on which the state of the target lock is the Lock pending state performs a lock operation on the target lock.

* * * * *

UNITED STATES PATENT AND TRADEMARK OFFICE
CERTIFICATE OF CORRECTION

PATENT NO. : 9,449,041 B2  
APPLICATION NO. : 14/323546  
DATED : September 20, 2016  
INVENTOR(S) : Yuanyuan Nie, Huijun Liu and Chuanting Wang Page 1 of 1

It is certified that error appears in the above-identified patent and that said Letters Patent is hereby corrected as shown below:

In the Claims

Column 40, Line 24, Claim 6 should read:

A database system lock operation method, comprising:
    acquiring, by a first processing node, a lock operand of a target lock, wherein the lock operand is used to record a current state of the target lock on each processing node in a database system, and the current state of the target lock on each processing node in the database system is represented by one or more data bits in the lock operand;
    performing, by the first processing node, a lock releasing operation on a target data object using the target lock;
    acquiring, by the first processing node, an original value of the lock operand at a moment when the target lock is used to perform the lock releasing operation on the target data object; and updating, by the first processing node, a value of a data bit that is in the lock operand and used to indicate a state of the target lock on the first processing node to an updated value that is used to indicate that the state of the target lock on the first processing node is No lock held, wherein the value of the data bit in the original value is added to a preset third value to obtain the updated value of the lock operand, wherein a processing node in the database system knows, according to the lock operand, that the state of the target lock on the first processing node is No lock held.

Column 41, Line 58, Claim 10 should read:

The node device according to claim 9, wherein the processor further causes the node device to: update, when the lock acquiring operation fails, the value of the data bit that is in the updated value and used to indicate the state of the target lock on the node device to a value that is used to indicate that the state of the target lock on the node device is Lock pending.

Signed and Sealed this  
Third Day of January, 2017

Michelle K. Lee  
*Director of the United States Patent and Trademark Office*